US007685015B2

(12) United States Patent
Najmi et al.

(10) Patent No.: US 7,685,015 B2
(45) Date of Patent: Mar. 23, 2010

(54) OPTIMIZED DEPLOYMENT OF PARTS IN A SUPPLY CHAIN NETWORK

(75) Inventors: Adeel Najmi, Plano, TX (US); Dharmaraj Veerappanaicker, Lexington, MA (US); Aseem Kohli, Melrose, MA (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 12/031,975

(22) Filed: Feb. 15, 2008

(65) Prior Publication Data

US 2008/0147490 A1 Jun. 19, 2008

Related U.S. Application Data

(60) Continuation-in-part of application No. 11/875,115, filed on Oct. 19, 2007, which is a continuation of application No. 11/696,297, filed on Apr. 4, 2007, which is a division of application No. 10/033,103, filed on Oct. 25, 2001, now Pat. No. 7,210,624.

(60) Provisional application No. 60/243,659, filed on Oct. 26, 2000.

(51) Int. Cl.
*G06Q 10/00* (2006.01)

(52) U.S. Cl. ........................... 705/10; 705/28; 235/385

(58) Field of Classification Search ..................... 705/8, 705/28, 10; 700/99, 106; 235/385, 375, 235/376; 709/203, 219, 223
See application file for complete search history.

(56) References Cited

U.S. PATENT DOCUMENTS 5,287,267 A 2/1994 Jayaraman et al.

(Continued)

FOREIGN PATENT DOCUMENTS

EP 1 722317 5/2005

(Continued)

OTHER PUBLICATIONS

U.S. Appl. No. 10/032,971, filed Oct. 25, 2001, entitled "Optimized Deployment of parts in a Distribution Network", 40 pages.

(Continued)

*Primary Examiner*—Andrew Joseph Rudy
(74) *Attorney, Agent, or Firm*—Booth Udall, PLC; Steven J. Laureanti

(57) ABSTRACT

Locations that include supply, manufacturing, demand locations, and channels are defined. A demand is computed for each part at each location. An availability lead-time is estimated for each part at each location and for each part at each channel. A total landed cost is calculated for each part at each location and each channel. A lead-time demand is computed for each part at each location using the availability lead-times for the part. A demand over lead-time is computed for each part at each location using the availability lead-times for the part. A completely filled demand is determined from the lead-time demands and the stock levels, and a partially filled demand is determined from the lead-time demands and the stock levels. A coverage function is generated for the parts at the locations and the channels from the completely filled demand and the partially filled demand.

45 Claims, 10 Drawing Sheets

U.S. PATENT DOCUMENTS

| | | | | |
|---|---|---|---|---|
| 5,765,143 | A | 6/1998 | Sheldon et al. | |
| 5,819,232 | A | 10/1998 | Shipman | |
| 5,946,662 | A | 8/1999 | Ettl et al. | |
| 5,960,414 | A | 9/1999 | Rand et al. | |
| 6,006,196 | A | 12/1999 | Feigin et al. | |
| 6,205,431 | B1 | 3/2001 | Willemain et al. | |
| 6,341,271 | B1 | 1/2002 | Salvo et al. | |
| 6,379,199 | B1 | 4/2002 | Chen | |
| 6,516,301 | B1 | 2/2003 | Aykin | |
| 6,609,101 | B1 | 8/2003 | Landvater | |
| 6,671,673 | B1 | 12/2003 | Baseman et al. | |
| 6,801,901 | B1 | 10/2004 | Ng | |
| 6,954,734 | B1 | 10/2005 | Kuelbs et al. | |
| 7,003,474 | B2 | 2/2006 | Lidow | |
| 7,130,807 | B1 * | 10/2006 | Mikurak | 705/7 |
| 7,210,624 | B1 * | 5/2007 | Birjandi et al. | 235/385 |
| 7,363,241 | B1 * | 4/2008 | Dong | 705/5 |
| 7,363,249 | B1 | 4/2008 | Boesjes | |
| 7,457,783 | B2 | 11/2008 | Kawabata et al. | |
| 2005/0160121 | A1 | 7/2005 | Kawabata et al. | |
| 2008/0040183 | A1 | 2/2008 | Birjandi et al. | |

FOREIGN PATENT DOCUMENTS

| | | |
|---|---|---|
| EP | 1722317 A | 5/2005 |
| WO | WO 2007/060985 | 5/2007 |
| WO | WO 2007/078371 | 7/2007 |

OTHER PUBLICATIONS

Robert Bianco, Minimize total landed cost: Strategize, Model, Act Jan. 2006, http://www.inboundlogistics.com/articles/3plline/3plline0106.shtml.

Robert Bianco, Minimize total landed cost: Strategize, Model, Act. Jan. 2006, http://www.inboundlogistics.com/3plline0106.shtml.

* cited by examiner

OPTIMIZED DEPLOYMENT OF PARTS IN A SUPPLY CHAIN NETWORK

CLAIM OF PRIORITY

This application is a continuation-in-part of U.S. patent application Ser. No. 11/875,115, filed on 19 Oct. 2007 and entitled "REDISTRIBUTION OF PARTS IN A DISTRIBUTION NETWORK", now U.S. Pat. No. 7,580,825 which is a continuation of U.S. patent application Ser. No. 11/696,297, filed on 4 Apr. 2007 and entitled "REDISTRIBUTION OF PARTS IN A DISTRIBUTION NETWORK" now U.S. Pat. No. 7,562,812 which is a divisional of U.S. patent application Ser. No. 10/033,103, filed on 25 Oct. 2001 and entitled "REDISTRIBUTION OF PARTS IN A DISTRIBUTION NETWORK", now U.S. Pat. No. 7,210,624 which claims priority under 35 U.S.C. §119(e) to U.S. Provisional Application Ser. No. 60/243,659 filed 26 Oct. 2000 and entitled "SYSTEM AND METHOD FOR OPTIMIZED DEPLOYMENT OF INVENTORY, OR RE-DISTRIBUTION OF EXISTING INVENTORY, ACROSS A MULTI-ECHELON DISTRIBUTION NETWORK".

U.S. Pat. No. 7,580,825, U.S. Pat. No. 7,562,812, U.S. Pat. No. 7,210,624, and U.S. Provisional Application Ser. No. 60/243,659 are commonly assigned to the assignee of the present application. The disclosure of related U.S. Pat. 7,580,825, U.S. Pat. No. 7,562,812, U.S. Pat. No. 7,210,624, and U.S. Provisional Application Ser. No. 60/243,659 are hereby incorporated by reference into the present disclosure as if fully set forth herein.

BACKGROUND

1. Technical Field of the Invention

This invention relates generally to the field of inventory distribution across supply networks and more specifically to optimized deployment of parts in a supply chain network.

2. Background of the Invention

A supply chain network may include one or more locations that receive parts from a vendor and distribute the parts within the supply chain network in order to provide a customer with a product. The parts may be, for example, manufactured into a product within the supply chain network. The supply chain network may include locations that both supply parts to and receive parts from other locations. Performance at each location is thus affected by the performance at its suppliers. As a result, maintaining an optimal inventory of parts at each location that best serves the customer while minimizing inventory costs poses a challenge for inventory managers.

SUMMARY OF THE INVENTION

A method for deploying a plurality of parts in a supply chain network is disclosed. The method provides for defining a plurality of locations. The plurality of locations include a plurality of supply locations, a plurality of manufacturing locations, a plurality of demand locations, and a plurality of channels. The method further provides for computing a demand for each part at each location, estimating an availability lead-time for each part at each location and for each part at each channel, and calculating a total landed cost for each part at each location and for each part at each channel. The method still further provides for computing a lead-time demand for each part at each location and for each part at each channel using the availability lead-times for the part and computing a stock level for each part at each location and for each part at each channel. The method yet further provides for determining a completely filled demand from the lead-time demands and the stock levels, determining a partially filled demand from the lead-time demands and the stock levels, and generating a coverage function for the parts at the locations and the channels from the completely filled demand and the partially filled demand.

A system for deploying a plurality of parts in a supply chain network is also disclosed. The system provides for defining a plurality of locations. The plurality of locations include a plurality of supply locations, a plurality of manufacturing locations, a plurality of demand locations, and a plurality of channels. The system further provides for computing a demand for each part at each location, estimating an availability lead-time for each part at each location and for each part at each channel, and calculating a total landed cost for each part at each location and for each part at each channel. The system still further provides for computing a lead-time demand for each part at each location and for each part at each channel using the availability lead-times for the part and computing a stock level for each part at each location and for each part at each channel. The system yet further provides for determining a completely filled demand from the lead-time demands and the stock levels, determining a partially filled demand from the lead-time demands and the stock levels, and generating a coverage function for the parts at the locations and the channels from the completely filled demand and the partially filled demand.

Software for deploying a plurality of parts in a supply chain network is also disclosed. The software provides for defining a plurality of locations. The plurality of locations include a plurality of supply locations, a plurality of manufacturing locations, a plurality of demand locations, and a plurality of channels. The software further provides for computing a demand for each part at each location, estimating an availability lead-time for each part at each location and for each part at each channel, and calculating a total landed cost for each part at each location and for each part at each channel. The software still further provides for computing a lead-time demand for each part at each location and for each part at each channel using the availability lead-times for the part and computing a stock level for each part at each location and for each part at each channel. The software yet further provides for determining a completely filled demand from the lead-time demands and the stock levels, determining a partially filled demand from the lead-time demands and the stock levels, and generating a coverage function for the parts at the locations and the channels from the completely filled demand and the partially filled demand.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
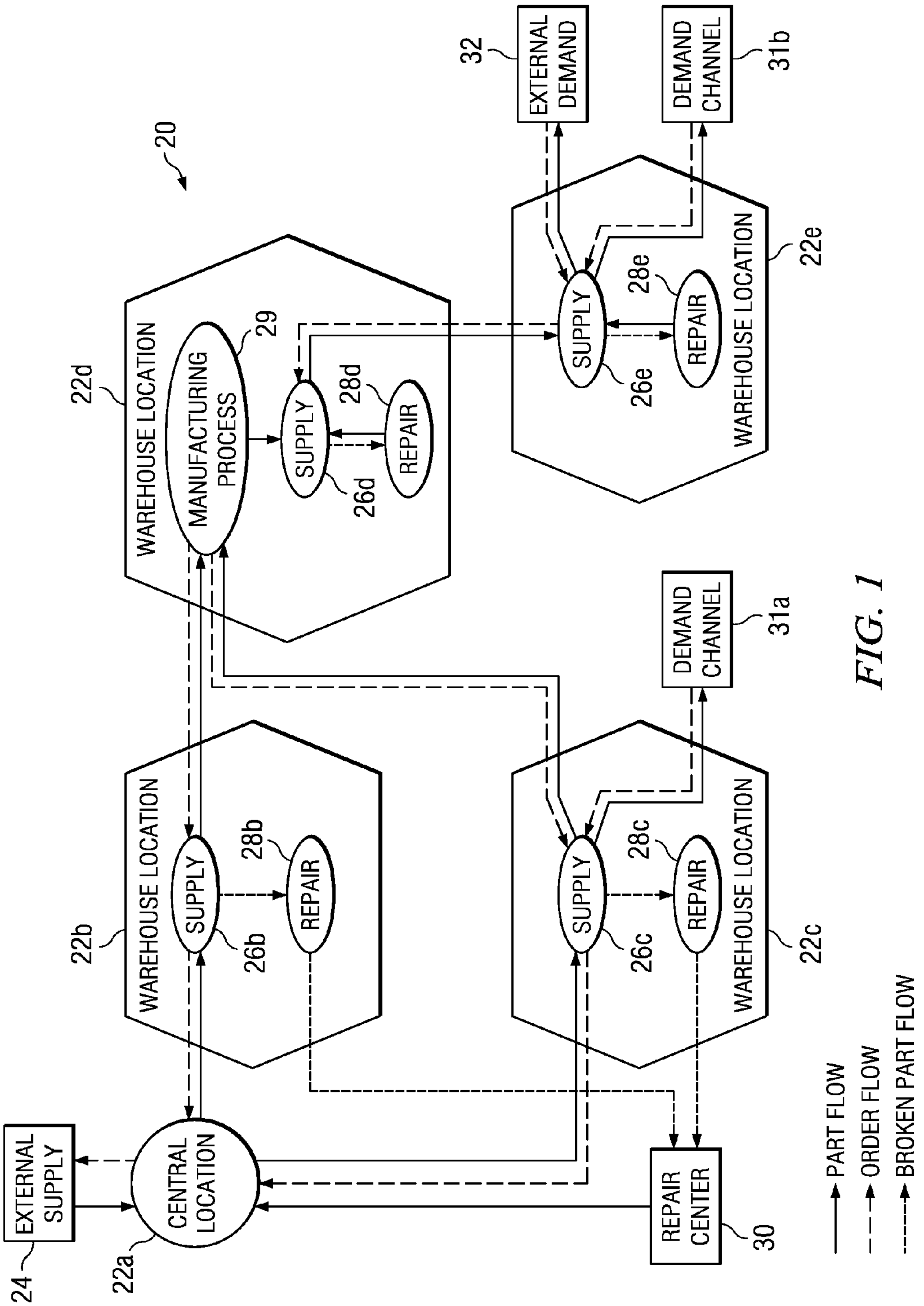
FIG. 1 illustrates an example supply chain network for deploying and redistributing inventory of one or more parts among one or more locations.

FIG. 1 illustrates an example supply chain network 20 for deploying and redistributing inventory of one or more parts among one or more locations 22. Supply chain network 20 includes locations 22 that distribute parts throughout supply chain network 20. A part may comprise, for example, a product, a portion of a product, a device used to manufacture a product, or any other suitable item that may be distributed from one location 22 to another location 22 in supply chain network 20.

In one embodiment, locations 22 include a central location 22*a* and one or more warehouse locations 22*b-e*. Although central location 22*a* and warehouse locations 22*b-e* are illustrated, supply chain network 20 may include any suitable number of central locations 22 and warehouse locations 22. Each location 22 may comprise a supply location, a demand location, and/or a manufacturing location. A supply location supplies a part to a demand location, and may supply the part in response to an order for the part sent from the demand location. For example, warehouse location 22*b* supplies parts to warehouse location 22*d* and warehouse locations 22*b-c* supply parts to location 22*d*. A location 22 may comprise both a demand location and a supply location. For example, warehouse location 22*b* receives parts from central location 22*a* and supplies parts to warehouse location 22*d*.

In addition, or as an alternative, a location 22 may also comprise a manufacturing location. For example, warehouse locations 22*b-c* provides parts to warehouse location 22*d* for manufacturing the received parts into one or more products and distributes the one or more products to warehouse location 22*e*. A supply endpoint such as central location 22*a* receives parts from one or more external suppliers 24, for example, a vendor, and distributes the parts to warehouse locations 22*b-e*. A demand endpoint such as warehouse location 22*c* or warehouse location 22*e* provides parts to one or more external demands 32, for example, a customer or a demand channel 31.

Warehouse locations 22*b-e* may include supply operations 26*b-e*, repair operations 28*b-e*, and/or manufacturing operations 29. Although manufacturing operation 29 is illustrated, supply chain network 20 may include any suitable number of manufacturing operations 29. A supply operation 26 sends an order for a part to a supply location, which in response sends the part to supply operation 26. A repair operation 28 may receive a broken part from supply operation 26 and send the broken part to a repair center 30. Repair center 30 repairs the part and sends the repaired part to, for example, central location 22*a* or back to supply operation 26*b*. Alternatively, repair operation 28*d* may receive a broken part from supply operation 26*d*, repair the part, and send the repaired part back to supply operation 26*d*. A manufacturing operation 29 may receive one or more parts from supply operation 26 and manufacture them into one or more products or one or more end products. Supply operation 26 may distribute the resulting products to other demand locations 22 and/or to one or more external demands 32, for example, a customer or a demand channel 31.

The inventory for each part at each location 22 is monitored, continuously or periodically. In addition, the inventory for demand channel 31 is maintained at the demand location. For example, demand channel 31 may be a source of demand for a demand location, including a set of characteristics, such as, for example, mean, variance, and a desired target service level. In response to the inventory falling below a predetermined level, an order is placed to bring the inventory position back up to a target level such as an optimized inventory level. A method for deploying and redistributing inventory of one or more parts among one or more locations to achieve optimized inventory levels is described in more detail with reference to FIG. 2.

Figure 2:
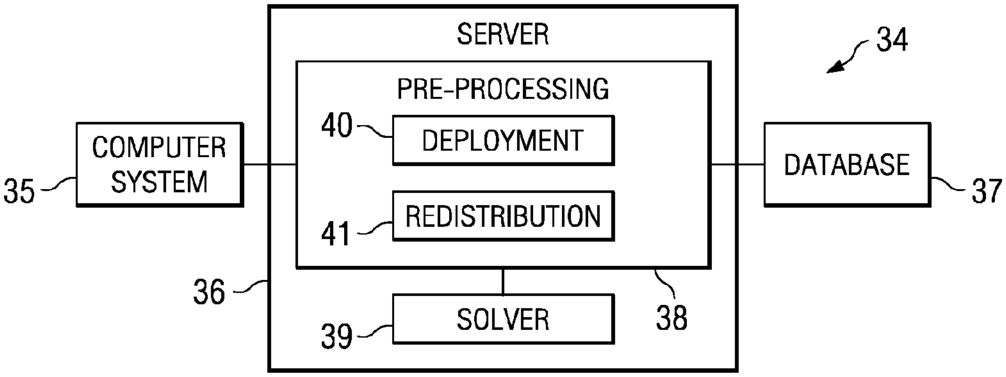
FIG. 2 illustrates an example system that generates optimized inventory deployment and redistribution plans.

FIG. 2 illustrates an example system 34 that generates optimized inventory deployment and redistribution plans. The inventory deployment plan describes a distribution of parts among locations 22 of supply chain network 20, and an inventory redistribution plan describes a manner of transferring inventory of parts (i.e., redistributing parts) from the excess locations to the deficit locations to satisfy the inventory deployment plan. Deployment may occur independently of redistribution. That is, inventory may be deployed, without ever being redistributed. In addition, redistribution may redistribute parts according to any suitable inventory plan.

System 34 may include a computer system 35, a server 36, and a database 37, which may share data storage, communications, or other resources according to particular needs. Computer system 35 may include appropriate input devices, output devices, mass storage media, processors, memory, or other components for receiving, processing, storing, and communicating information according to the operation of system 34. As used in this document, the term "computer" is intended to encompass a personal computer, workstation, network computer, wireless data port, wireless telephone, personal digital assistant, one or more microprocessors within these or other devices, or any other suitable processing device.

Server 36 manages applications that generate optimized inventory deployment and redistribution plans. Server 36 includes one or more software components such as a pre-processing module 38 and a solver 39. Pre-processing module 38 manages input and output operations, and computes a net demand and a replenishment lead-time for each part at each location 22 and each channel 31. Pre-processing module 38 manages input and output operations, and computes a net demand and a replenishment lead-time, or lead-time demand, related to a number of parts in a pipeline. Pre-processing module 38 also generates mathematical formulations, which are transmitted to solver 39, for solving, as described below in more detail.

Pre-processing module 38 may include a deployment module 40 and a redistribution module 41. Deployment module 40 may be used to generate a coverage function and constraints that describes the distribution of parts among locations 22. Solver 39 optimizes the coverage function to determine an optimized distribution of parts. Solver 39 may comprise a mathematical programming solver such as CPLEX by ILOG, INC. Redistribution module 41 may be used to generate a transfer function along with the constraints that describes the transfer of parts among locations 22. Solver 39 optimizes the transfer function to determine a cost optimal manner of redistributing parts. As noted above, deployment may occur independently of redistribution. That is, inventory may be deployed, without ever being redistributed. In addition, redistribution may redistribute parts according to an inventory plan generated by deployment module 40 or according to any suitable inventory plan.

Database 40 stores data that may be used by server 36. Data may include, for example, the history of the demand for each part at each location 22, the lead-time required to transport a part from one location 22 to another location 22, order lead-time profiles for each part at each location 22 and each channel 31, the maximum weight at each location 22, and the maximum space capacity for a location 22. Computing system 35 and database 40 maybe coupled to server 36 using one or more local area networks (LANs), metropolitan area networks (MANs), wide area networks (WANs), a global computer network such as the Internet, or any other appropriate wired, optical, wireless, or other links.

Figure 3:
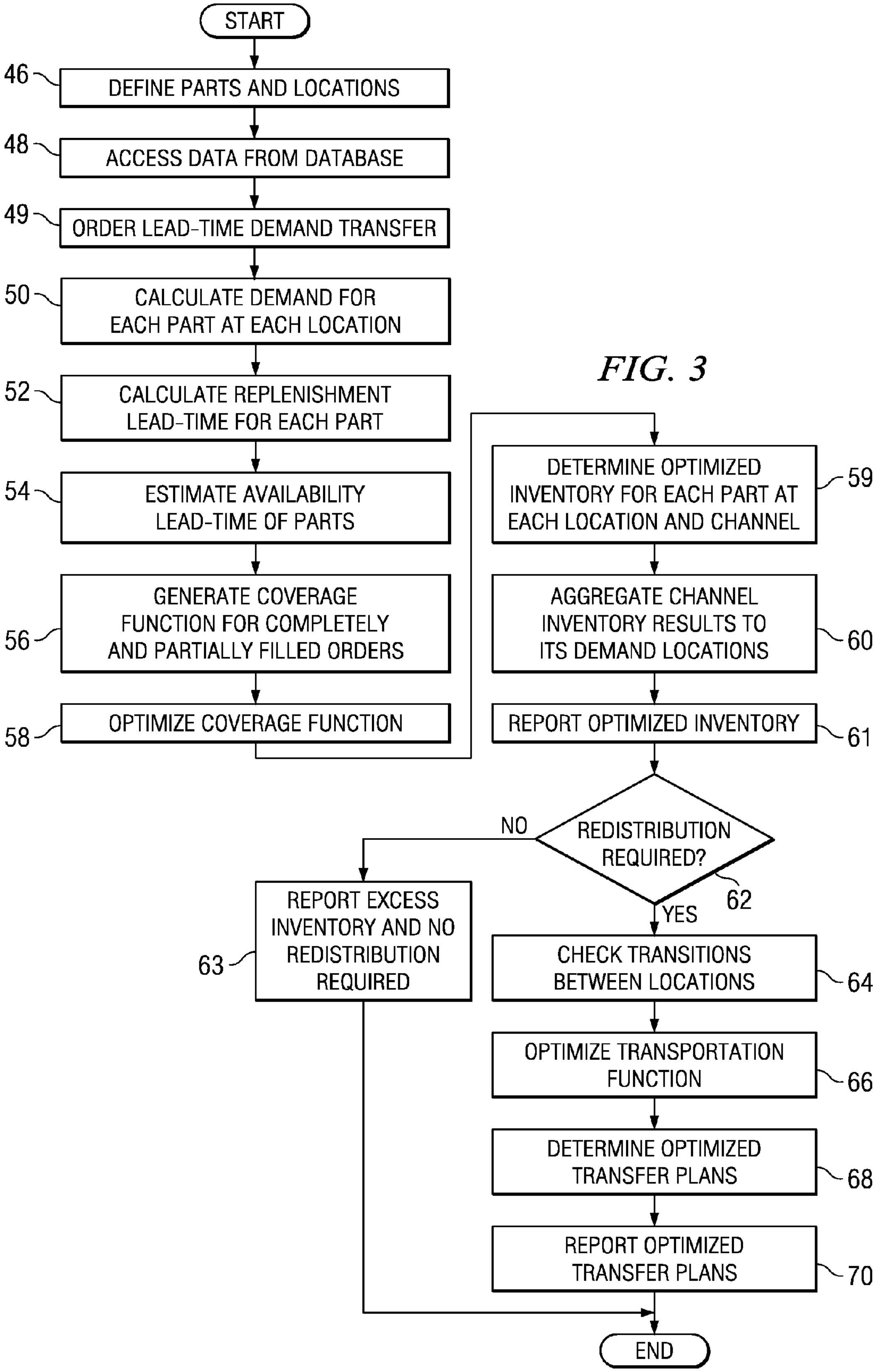
FIG. 3 illustrates an example method for deploying and redistributing inventory of one or more parts among one or more locations.

FIG. 3 illustrates an example method for deploying and redistributing inventory of one or more parts among one or more locations 22. Deployment may occur independently of redistribution. That is, inventory may be deployed, without ever being redistributed. In addition, redistribution may redistribute parts according to the inventory deployment plan described in connection with FIG. 3, or according to any suitable inventory plan.

Processing module 38 initiates the method at step 46 by defining a number 1,2, . . . ,i, . . . ,I of parts, a number 1, 2, . . . ,j, . . . ,J of locations 22, and a number of time periods 1,2, . . . ,t, . . . ,N. For example, j=1, 2, 3, 4, and 5 refer to warehouse locations 22*a-e*, respectively. At step 48, data is accessed from database 37. Data may include, for example, a demand history of each part at each location 22 and/or at each channel 31. The demand history may describe the number of parts that each location 22 requires. Data may include order lead-time profiles for each part at each location 22 and/or at each channel 31. In addition, each order lead-time profile may include a percentage of demand and the order lead-time. For example, order lead-time may be the duration by which a customer agrees to wait, that is, without any penalty on the suppliers, before receiving the parts for a specified percentage of the demand from the time the order was raised. Data may include the repair history that may describe the capability of each location 22 to repair a part. Data may include the lanes (i.e., the paths) that may be used to transfer parts between locations 22, along with the costs associated with transporting parts along the lanes. Data may include the cost of purchasing a part, the cost of holding (i.e., storing) a part in the location as a percentage of the purchase cost for the part, a cost associated with investment holding as a percentage of the purchase cost, a cost associated with handling a part, and a fixed cost associated with ordering a part. Data may include a bill-of-materials that may describe the details of, for example, raw materials, end products, process time, and associated process cost for a manufacturing process.

At step 49, order lead-time demand transfers are calculated for each part at each location 22 and/or at each channel 31. The demand transfers to the upstream locations 22 are determined based on the order lead-time demand profiles defined for each part at each location 22 and/or at each channel 31. The order lead-time profile may include, for example, a percentage of demand and a particular time limit. The particular time limit may be referred to as an order lead-time. Demand transfers from location 22, based on an order lead-time profile, may end up at an upstream location 22 or at an external supply 24, depending upon the replenishment lead-times between supply locations and demand locations associated with each location 22.

Once the demand has been transferred to an upstream location 22, a virtual location is created and attached to the upstream location 22. The virtual location will have all the characteristics of the demand location, from where the demand was transferred. Similarly, if a demand is transferred to an upstream location 22 from a channel 31, a virtual channel is created and attached to the upstream location 22. The virtual channel will have all the characteristics of channel 31 from where the demand was transferred. The inventory at the virtual locations and virtual channels are aggregated and deployed at the supply locations to which they are attached.

At step 50, a demand for each part at each location 22 is calculated. The demand may include a dependent demand and an independent demand. A dependent demand at location 22 describes the parts that location 22 supplies to other locations 22. An independent demand at location 22 describes parts used at location 22. The demand at location 22 may account for the probability that a part is repaired and placed back into the inventory at location 22. Demand may be calculated by starting at a demand endpoint and ending at a supply endpoint of supply chain network 20. In addition, a demand for each part at each manufacturing operation 29 is calculated, such that, a demand for an end product is converted into a demand for a raw material part based on, among other things, the manufacturing yield of the part or another suitable conversion ratio defined in, for example, a bill-of-materials. A method for calculating a demand for a part at each location 22 is described in more detail with reference to FIG. 4.

A replenishment lead-time for each part at each location 22 is calculated at step 52. The replenishment lead-time for a part at location 22 describes the time required for location 22 to receive the part from another location 22. The replenishment lead-time may be computed by starting at a supply endpoint and ending at a demand endpoint. An availability lead-time for each part at each location 22 is estimated at step 54. The availability lead-time at a location 22 describes the waiting time due to back order at the location 22 plus the transfer lead-time from the supplier to location 22 and the replenishment lead-time for the supplier of location 22. An availability lead-time for each part at each manufacturing operation 29 describes a waiting time due to, for example, a back order at a location 22 plus the process time that is required to manufacture one or more end products from one or more raw material parts and the replenishment lead-time for a raw material parts supplier of a location 22 that has the greatest replenishment lead-time, that is, if there are more than one raw material parts supplier. A method for estimating the availability lead-time of a part at location 22 is described in more detail with reference to FIG. 5.

A coverage function is formulated at step 56. The coverage function describes the expected ability of a location 22 to completely or partially fill an order for a part, and may be determined from the demand, availability lead-time of the part and the inventory level for the part at location 22. The coverage function may be described using the expected backorder of the part at location 22. A method for determining the coverage is described in more detail with reference to FIG. 7.

Solver 39 optimizes the coverage function at step 58. Optimizing the overall coverage function may be accomplished by minimizing the sum of expected backorders. At step 59, an optimized inventory level for each part at each location 22 and/or each channel 31 is determined. At step 60, the resulting inventory parameters for each channel 31 are aggregated for each of locations 22. At step 61, solver 39 reports the optimized inventory level for each part at each location 22. As noted above, deployment may occur independently of redistribution, that is, inventory may be deployed, without ever being redistributed.

At step 62, redistribution module 41 determines whether redistribution is required by calculating an excess and deficit for each part at each location 22 from the actual inventory and the optimal deployment. Redistribution of the inventory may be required if, for example, the actual inventory at each location 22 does not match the optimized inventory calculated for each location 22. As noted above, redistribution may redistribute parts according to the optimized inventory reported at step 61, or according to any suitable inventory plan. If redistribution is not required, deployment module 40 proceeds to step 63 to report any excess inventory and a recommendation to not perform a redistribution of parts. After reporting the result, the method is terminated. If redistribution is required, redistribution module 41 proceeds to step 64 to check the transitions between locations 22. The transitions describe paths that may be used to transfer parts from one location 22 to another location 22.

At step 66, a transfer function describing the transfer of optimized parts between locations 22 is optimized. Minimizing the total cost associated with transporting the parts may optimize the transfer function. A method for determining optimized transfer plans for the parts between locations 22 is described in more detail with reference to FIG. 8. At step 70, the optimized transfer plans, the resulting inventory levels, and possible excess in inventory of parts in supply chain network 20 are reported. After reporting the result, the method is terminated.

Figure 4:
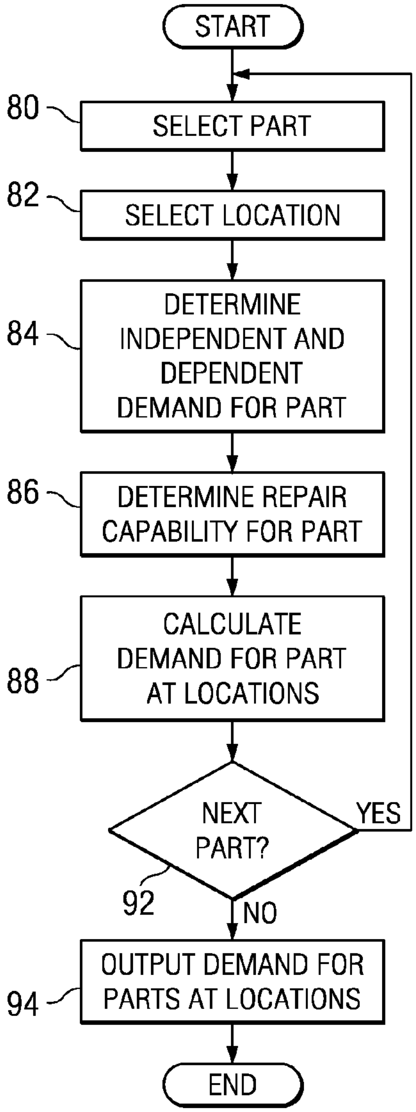
FIG. 4 illustrates an example method for calculating a demand for one or more parts at one or more locations for one or more time periods.

FIG. 4 illustrates an example method for calculating a demand for one or more parts at one or more locations 22 and/or one or more time periods. Deployment module 40 initiates the method at step 80 by selecting a part i. A location j is selected at step 82. Location j may be selected such that the demand at a channel 31 or at a demand endpoint is calculated first, and the demand at a supply endpoint is calculated last.

At step 84, an independent and the dependent demand for part i at location j is determined. The independent demand for part i at location j and time period t may be represented by $\lambda'_{ijt}$. The dependent demands for part i at location j may be represented $\lambda_{ikt}$, for all k such that k is a demand point for location j. At step 86, the repair capability $r_{ijt}$ for part i at location j and time period t is determined. The repair capability $r_{ijt}$ may be determined from the proportion of demand for part i at location j and time period t that is repairable at location j. Demand is calculated at step 88. Starting with demand endpoints j, demand $\lambda_{ijt}$ for part i and time period t is equal to its independent demand. For any location j that is not a demand endpoint, the demand $\lambda_{ijt}$ for part i may be calculated using Equation (1):

$$\lambda_{ijt}=\lambda'_{ijt}+\Sigma(1-r_{ikt})\lambda_{ikt} \tag{1}$$

At step 90, deployment module 40 determines if there is a next location. If there is no next location, deployment module 40 proceeds to step 92 to determine whether there is a next part for which a demand is to be determined. If there is a next part, deployment module 40 returns to step 80 to select the next part. If there is no next part, deployment module 40 proceeds to step 94 to output the calculated demand for each part at each location. If there is a manufacturing operation 29, then a demand for an end product is converted into a demand for a raw material part based on, for example, the manufacturing yield. After outputting the demand, the method is repeated for the next time period until the demand for each part at each location and time period is calculated. After outputting the demand, the method is terminated.

Figure 5:
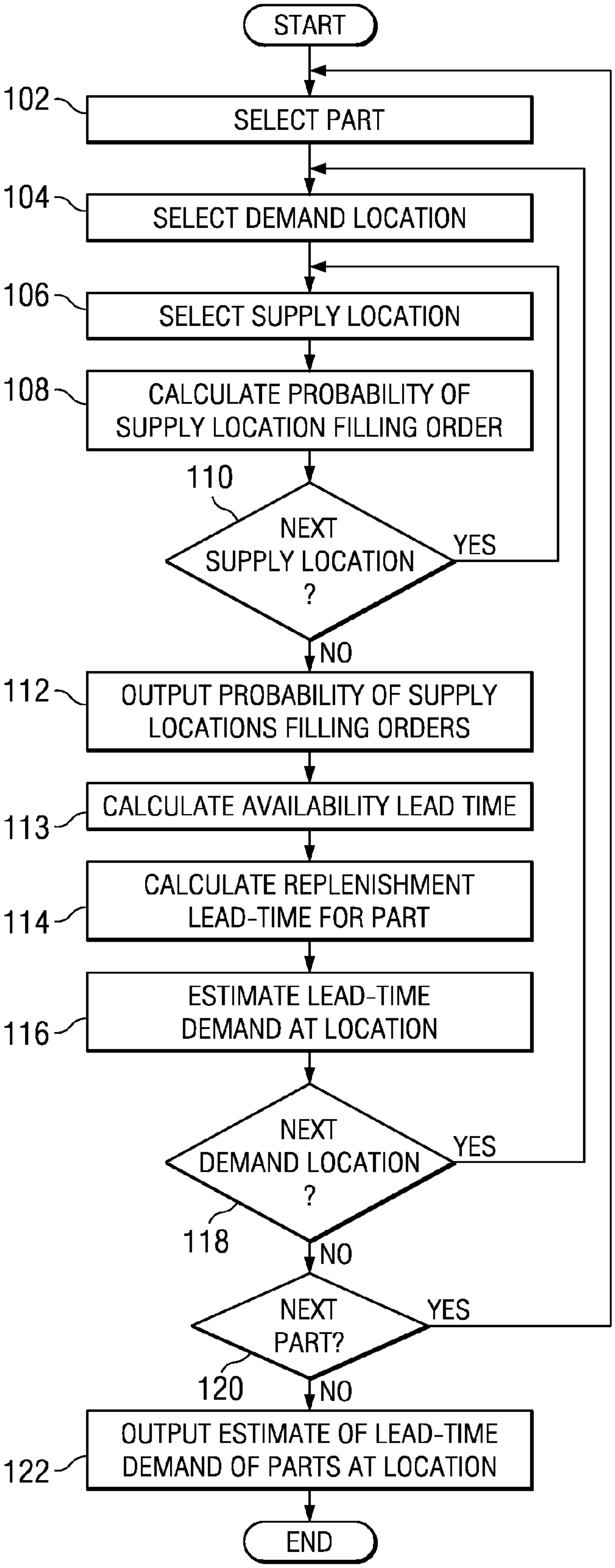
FIG. 5 illustrates an example method for estimating the availability lead-time of one or more parts at one or more locations.

FIG. 5 illustrates an example method for estimating the availability lead-time of one or more parts at one or more locations 22 for one or more time periods. Deployment module 40 initiates the method at step 102 by selecting a part i. A demand location j is selected at step 104, and a supply location $l_k$ is selected at step 106. The supply location $l_k$ may be selected from a prioritized list of n supply locations $l_1, \ldots l_n$. For each supply location $l_k$, the list may describe a proportion $p_{ilkjt}$ of a demand for part i at demand location j that is scheduled to be satisfied by supply location $l_k$ during time period t, a probability $\alpha_{ilkjt}$ that part i is filled at supply location $l_k$ for demand location j during time period t, and a lead-time $T_{ilkjt}$ for a part i to flow from supply location $l_k$ to demand location j during time period t. Demand location j and supply location $l_k$ may be selected such that the availability lead-time at a supply endpoint is calculated first, and the availability lead-time at a demand endpoint is calculated last.

At step 108, a probability $P_{ilkjt}$ of a supply location $l_k$ filling an order for part i placed by a demand location j during time period t, given that the order is not filled by another supply location, is calculated. The probability $P_{il1jt}$ for supply location $l_1$ may be computed using Equation (2):

$$P_{il1jt}=p_{il1jt}\,\alpha_{il1jt} \tag{2}$$

At step 110, deployment module 40 determines whether there is a next supply location $l_k$. If there is a next supply location, deployment module 40 returns to step 106 to select the next supply location. The probability $P_{ilkjt}$ of the next supply location $l_k$ filling an order for part i placed by demand location j, given that the order is not filled by another supply location, may be computed at step 108 using the process described by the recursive Equations (3):

$$P_{ilkjt}=p'_{ilkjt}\,\alpha_{ilkjt} \tag{3}$$

where $$p'_{il1jt}=p_{il1jt}$$

$$p'_{ilkjt}=p_{ilkjt}+(1-\alpha_{ilk-1jt})p_{ilk-1jt} \text{ for } k>1$$

If there is no next supply location at step 110, deployment module 40 proceeds to step 112 to output the probabilities of the supply locations $l_k$ fulfilling an order for part i placed by demand location j.

At step 113, an availability lead-time $T_{ijt}$ for part i at each location j is calculated. Availability lead-time $T_{ijt}$ may be calculated according to the recursive Equation (4):

$$T_{ijt}=\sum_{k=1}^{n}\left(T_{ilkjt}+\frac{EBO_{ilkjt}(S_{ilkt})}{\mu_{ilkt}}T_{ilkt}\right)P_{ilkjt} \tag{4}$$

where $EBO_{ilkjt}(S_{ilkt})$ is the expected backordered demand for part i at supply location $l_k$ and time period t corresponding to a stock level $S_{ilkt}$, and $\mu_{ilkt}$ represents the mean number of parts i in the pipeline at supply location $l_k$ for time period t. The expected backordered demand can be determined if the demand distribution is known. For example, the demand pattern for parts can be categorized as follows: slow movers—parts with low demand and high cost; fast movers—parts with high demand and low cost; and seasonal—parts with seasonally varying demand. In one embodiment, Poisson distribution, Normal distribution, and Gamma distribution of demands for slow movers, fast movers and seasonal demand patterns respectively are the best fit.

Poisson distribution: The expected number of backordered demand $EBO_c$ may be described by Equation (5):

$$EBO_c = (1-\chi)\sum_{x=S_{ijt}}^{\infty} xP\langle x \mid \mu_{ijt}\rangle \quad (5)$$

where $\chi$ is the percentage of partial fill allowed for a part i and $P<x|\mu_{ijt}>=e^{-\mu_{ijt}}\mu_{ijt}^{x}/x!$ is the Poisson probability mass function for the distribution of demand with mean $\mu_{ijt}$. The expected number of partially backordered demand $EBO_p$ for part i at location j may be described by Equation (6):

$$EBO_p = \chi\sum_{x=S_{ijt}}^{\infty}(x-S_{ijt})P\langle x \mid \mu_{ijt}\rangle \quad (6)$$

The expected number of backorders $EBO_{ilkjt}(S_{ilkt})$ having the stock level $S_{ijt}$ of part i at location j may be defined using Equation (7):

$$\begin{aligned} EBO_{ilkjt}(S_{ilkt}) &= (1-\chi)\sum_{x=S_{ijt}}^{\infty} xP\langle x \mid \mu_{ijt}\rangle + \chi\sum_{x=S_{ijt}}^{\infty}(x-S_{ijt})P\langle x \mid \mu_{ijt}\rangle \\ &= \sum_{x=S_{ijt}}^{\infty}(x-\chi S_{ijt})P\langle x \mid \mu_{ijt}\rangle \end{aligned} \quad (7)$$

Normal distribution: The expected number of completely backordered demand $EBO_c$ may be described by Equation (8):

$$EBO_c = (1-\chi)\int_{x=S_{ijt}}^{\infty} xN\langle x \mid \mu_{ijt}\rangle\, dx \quad (8)$$

where $$N\langle x \mid \mu_{ijt}\rangle = \frac{1}{\sigma\sqrt{2\pi}}\left(e^{-\left(\frac{x-\mu_{ijt}}{\sigma}\right)^2}\right)$$

is the probability function for the Normal distribution of demand with mean $\mu_{ijt}$. The expected number of partially backordered demand $EBO_p$ for part i at location j may be described by Equation (9):

$$EBO_p = \chi\int_{x=S_{ijt}}^{\infty}(x-S_{ijt})N\langle x \mid \mu_{ijt}\rangle\, dx \quad (9)$$

The expected number of backorders $EBO_{ilkjt}(S_{ilkt})$ for Normal distribution may be defined using Equation (10):

$$\begin{aligned} EBO_{ilkjt}(S_{ilkt}) &= (1-\chi)\int_{x=S_{ijt}}^{\infty} xN\langle x \mid \mu_{ijt}\rangle\, dx + \chi\int_{x=S_{ijt}}^{\infty}(x-S_{ijt})N\langle x \mid \mu_{ijt}\rangle\, dx \\ &= \int_{x=S_{ijt}}^{\infty}(x-\chi S_{ijt})N\langle x \mid \mu_{ijt}\rangle\, dx \end{aligned} \quad (10)$$

Gamma distribution: The expected number of backorders $EBO_{ilkjt}(S_{ilkt})$ for Gamma distribution may be defined using Equation (11):

$$EBO_{ilkjt}(S_{ilkt}) = \chi\int_{x=S_{ijt}}^{\infty}(x-\chi S_{ijt})G\langle x \mid \mu_{ijt},\theta\rangle\, dx \quad (11)$$

where $$G\langle x \mid \mu_{ijt},\theta\rangle = \frac{x^{\mu_{ijt}-1}e^{-\left(\frac{x}{\theta}\right)}}{\theta^{\mu_{ijt}}\Gamma(\mu_{ijt})}$$

is the probability function for the Gamma distribution, $$\Gamma(\mu_{ijt}) = \int_0^{\infty} z^{\mu_{ijt}-1}e^{-z}\, dz$$

is the Gamma function, and θ is the order size.

At step 114, the replenishment lead-time $\vartheta_{ijt}$ for part i at demand location j during time period t is calculated. The replenishment lead-time $\vartheta_{ijt}$ for part i at location j during time period t may be calculated using Equation (12):

$$\vartheta_{ijt} = r_{ijt}\tau_{ijt} + (1-r_{ijt})T_{ijt} \quad (12)$$

Where $\tau_{ijt}$ represents the repair lead-time for part i at demand location j during time period t.

The lead-time demand $\mu_{ijt}$ of a part i at demand location j during time period t is estimated at step 116. The lead-time demand is related to a number of parts in a pipeline. The lead-time demand may be estimated using Equation (13):

$$\mu_{ijt} = \lambda_{ijt}\vartheta_{ijt} \quad (13)$$

The lead-time demand calculation begins with a supply endpoint.

Once the lead-time demand is calculated for a supply endpoint, availability lead-time may be calculated for its demand locations. The replenishment lead-time for a demand location can be determined once the availability lead-times for all its supply locations are calculated. The method will continue until it reaches the demand endpoint. At step 116, demand over lead-time may be calculated if that is preferred over lead-time demand for stock level computation. The demand over lead-time $DOLT_{ijt}$ may be defined using Equation (14).

$$DOLT_{ijt} = \sum_{p=t}^{N} \left\{ \left[ \min\left( 1, \frac{\left( \vartheta_{ijt} - \sum_{s=t}^{p} L_s \right)}{L_p} \right) \right]^{x} \lambda_{ijp} \right\} \quad (14)$$

where $L_t$ is the length of the time period t in a desired unit, and $[x]^+=\max(0, x)$.

At step 118, deployment module 40 determines whether there is a next demand location. If there is a next demand location, deployment module 40 returns to step 104 to select the next demand location. If there is no next demand location, deployment module 40 proceeds to step 120 to determine whether there is a next part. If there is a next part, deployment module 40 returns to step 102 to select the next part. If there is no next part, deployment module 40 proceeds to step 122 to report the lead-time demand of each part at each location 22 during time period t. After reporting the lead-time demand, the method is terminated.

Figure 6:
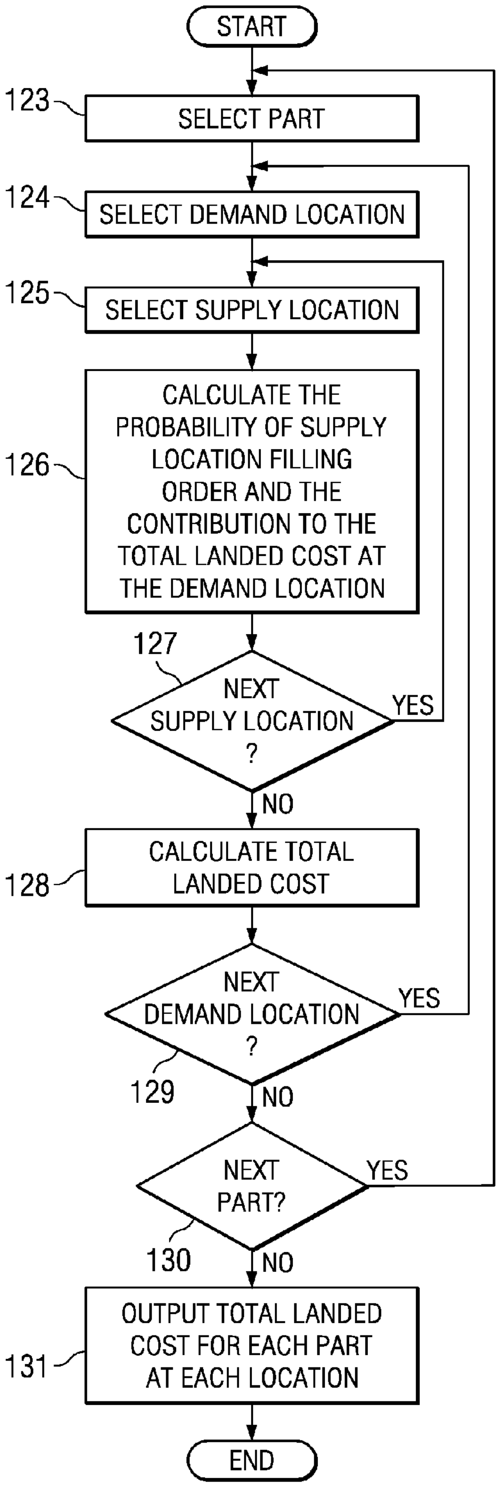
FIG. 6 illustrates an example method for calculating a total landed cost of one or more parts at one or more locations.

FIG. 6 illustrates an example method for calculating the total landed cost of one or more parts at one or more locations 22. Deployment module 40 initiates the method at step 123 by selecting a part i. A demand location j is selected at step 124, and a supply location $l_k$ is selected at step 125. The supply location $l_k$ may be selected from a prioritized list of supply locations $l_1, \ldots, l_n$. For example, for each supply location $l_k$, the prioritized list may describe: (1) a proportion $p_{ilkjt}$ of a demand for part i at demand location j that is scheduled to be satisfied by supply location $l_k$ during time period t; (2) a probability $\alpha_{ilkjt}$ that part i is filled at supply location $l_k$ for demand location j during time period t; (3) a total landed cost $C_{ilkjt}$ for a part i at supply location $l_k$; and (4) a transport cost $TC_{ilkjt}$ for a part i to flow from supply location $l_k$ to demand location j during time period t. Demand location j and supply location $l_k$ may be selected such that the total landed cost at a supply endpoint is calculated first, and the total landed cost at a demand endpoint is calculated last. If demand location j is a supply endpoint and $l_k$ is a vendor, then $C_{ilkjt}$ is the purchase cost.

At step 126, $P_{ilkjt}$ of a supply location $l_k$ filling an order for part i placed by a demand location j during time period t, may be calculated using Equation (3). At this step, the contribution of the total landed cost of part i at supply location $l_k$ to the total landed cost of part i at demand location j may also be calculated using Equation (15):

$$C'_{ilkjt}=P_{ilkjt}(C_{ilkjt}+TC_{ilkjt}) \quad (15)$$

At step 127, deployment module 40 determines whether there is a next supply location $l_k$. If there is a next supply location, deployment module 40 returns to step 125 to select the next supply location until all the supply locations are processed. At step 128, a total landed cost $C_{ijt}$ for part i at demand location j and time period t is calculated using Equation (16):

$$C_{ijt} = HC_{ijt} + \sum_{k=1}^{n} C'_{ilkjt} \quad (16)$$

where $HC_{ijt}$ is the handling cost of part i at location j during time period t.

If location j is a manufacturing location and part i is an end product of the manufacturing process, then the contribution of the total landed cost of the raw material parts are taken into account for computing the total landed cost of the end product at the manufacturing location. The total landed cost for end product i at location j and time period t may be calculated using Equation (17):

$$C_{ijt} = HC_{ijt} + PC_{ijt} + \sum_{k=1}^{n} C'_{mklkjt} \quad (17)$$

where $m_1, \ldots, m_n$ are raw material parts supplied respectively from locations $l_1, \ldots, l_n$, and $PC_{ijt}$ is the manufacturing process cost of part i at location j during time period t.

At step 129, deployment module 40 determines whether there is a next demand location. If there is a next demand location, deployment module 40 returns to step 124 to select the next demand location. If there is no next demand location, deployment module 40 proceeds to step 130 to determine whether there is a next part. If there is a next part, deployment module 40 returns to step 123 to select the next part. If there is no next part, deployment module 40 proceeds to step 131 to report the total landed cost of each part at each location 22. The process is repeated for all the time periods. In one embodiment, the total landed cost $C_{ij}$ for each part at each location 22 may be calculated using a simple average or demand weighted average of the total landed cost across the time periods. After calculating the total landed cost $C_{ij}$ for each part at each location 22, the method is terminated.

Figure 7:
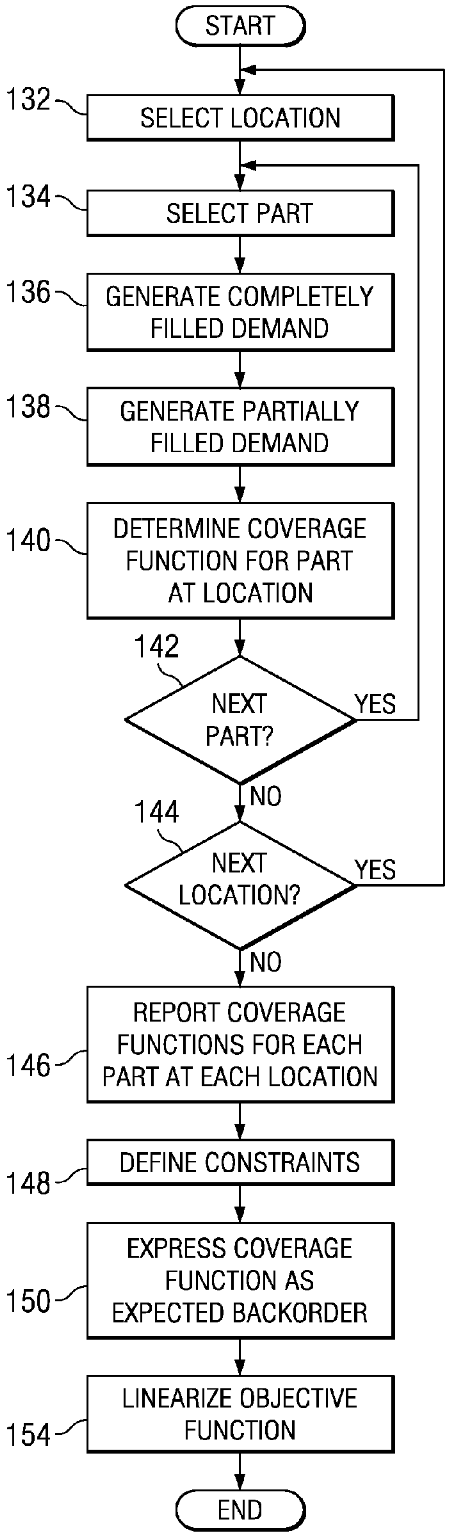
FIG. 7 illustrates an example method for generating a coverage function for one or more parts at one or more locations.

FIG. 7 illustrates an example method for generating a coverage function for one or more parts at one or more locations 22. Deployment module 40 initiates the method at step 132 by selecting a location j. A part i is selected at step 134.

At step 136, a completely filled demand $D_c$ for part i at location j is calculated at step 136. A completely filled demand $D_c$ for Poisson distribution, may be described by Equation (18):

$$D_c = \sum_{x=0}^{S_{ijt}-1} xP\langle x \mid \mu_{ijt} \rangle \quad (18)$$

where $P\langle x|\mu_{ijt}\rangle = e^{-\mu_{ijt}} \mu_{ijt}^{x}/x!$ is the Poisson probability mass function for the distribution of demand with mean $\mu_{ijt}$.

A partially filled demand $D_p$ for part i at location j is calculated at step 138. The partially filled demand $D_p$ for Poisson distribution, may be described by Equation (19):

$$D_p = \chi(S_{ijt} - 1)\left[1 - \sum_{x=0}^{S_{ijt}-1} P\langle x \mid \mu_{ijt} \rangle\right] \quad (19)$$

where $\chi$ is the percentage of partial fill allowed for the part. At step 140, a coverage function for part i at location j is determined.

The partially filled demand and completely filled demand may be expressed in a similar manner for Normal and Gamma distributions. However, for simplicity and clarity, the Equations hereafter, assume Poisson distribution. Those skilled in the art will understand that this is by way of illustration only and should not be construed so as to limit the scope of the invention. The coverage function for part i at location j describes the expected proportion of filled demand for part i at location j, and maybe expressed using Equation (20):

$$\left\{\sum_{x=0}^{S_{ijt}} xP\langle x \mid \mu_{ijt}\rangle + \chi \sum_{x=S_{ijt}}^{\infty} (S_{ijt}-1)P\langle x \mid \mu_{ijt}\rangle\right\} \Big/ \mu_{ijt} = \left\{\sum_{x=0}^{S_{ijt}} (x-\chi(S_{ijt}-1))P\langle x \mid \mu_{ijt}\rangle + \chi(S_{ijt}-1)\right\} \Big/ \mu_{ijt} \quad (20)$$

At step 142, deployment module 40 determines whether there is a next part. If there is a next part, deployment module 40 returns to step 134 to select the next part. If there is no next part, deployment module 40 proceeds to step 144 to determine whether there is a next location. If there is a next location, deployment module 40 returns to step 132 to select the next location. If there is no next location, deployment module 40 proceeds to step 146 to determine the coverage function for the number of parts at the number of locations. The coverage function may be expressed as the weighted average of coverage for the parts at locations. The coverage function for the parts at the locations may be expressed by the equation (21):

$$\sum_{j=1}^{J}\left\{\sum_{i=1}^{I} \beta_i \sum_{x=0}^{S_{ijt}} [x-\chi S_{ijt}]P\langle x \mid \mu_{ijt}\rangle + \chi S_{ijt}\right\} \Big/ \sum_{i=1}^{I} \mu_{ijt},\ \forall_t \quad (21)$$

where $\beta_i$ represents a weight of part i, which may be based on an importance measure of part i.

At step 148, constraints for the coverage function may be defined. As an example only and not by way of limitation, constraints may include, the following:

a. The weighted average of coverage for the parts at each location j is greater than or equal to the coverage target $\omega_{jt}$ at location j, which may be expressed by Equation (22a):

$$\sum_{i=1}^{I}\left\{\sum_{x=0}^{S_{ijt}} [x-\chi S_{ijt}]P\langle x \mid \mu_{ijt}\rangle + \chi S_{ijt}\right\} \Big/ \sum_{i=1}^{I} \mu_{ijt} \geq \omega_{jt},\ \forall_j,\ \forall_t \quad (22a)$$

b. The coverage for each part i at each location j is greater than or equal to the coverage target $\alpha_{ijt}$ for part i at location j, which may be expressed by Equation (22b):

$$\sum_{x=0}^{S_{ijt}} [x-\chi S_{ijt}]P\langle x \mid \mu_{ijt}\rangle + \chi S_{ijt} \geq \alpha_{ijt}\mu_{ijt},\ \forall_i,\ \forall_j,\ \forall_t \quad (22b)$$

c. The number of new purchases for a part i, $X_{ijt}$, at location j, which may be expressed by Equation (22c):

$$X_{ijt}=[S_{ijt}+\gamma_i\lambda_{ijt}-Y_{ijt}]^+,\ \forall_i,\ \forall_j,\ \forall_t \quad (22c)$$

where $\gamma_i$ represents a proportion of a demand for a failed part i, $[x]^+=\max(0, x)$, and $Y_{ijt}$ represents an on-hand inventory for part i at location j.

However, in a multi-time period model, the on-hand inventory is available only for the first time period, which is $Y_{ij}$, and the new purchases may be made across the time periods for a part i at location j. The stock level $S_{ijt}$ of a part i at location j may reach a maximum value $S_{ij}$ for one or more time periods as defined in Equation (22ci):

$$S_{ijt} \leqq S_{ij},\ \forall_t \quad (22ci)$$

$$S_{ij}=\max(S_{ij1}, \ldots, S_{ijt}, \ldots S_{ijN})$$

The demand due to failure for a part i at location j for a multi-time period model may be calculated by multiplying the proportion $\gamma_i$ with the total demand $\lambda_{ij}$ across the time periods. The total demand across all the time periods may be defined by Equation (22cii).

$$\lambda_{ij} = \sum_{t=1}^{N} \lambda_{ijt} \quad (22cii)$$

Therefore, the new purchases for a multi-time period model may be represented by Equation (22ciii):

$$X_{ij} = [\max(S_{ijt}) + \gamma_i\lambda_{ij} - Y_{ij}]^+,\ \forall_i,\ \forall_j \quad (22ciii)$$

$$= [S_{ij} + \gamma_i\lambda_{ij} - Y_{ij}]^+,\ \forall_i,\ \forall_j$$

d. The inventory investment at each location j is less than or equal to the inventory investment limit $Inv_j$ for location j, which may be expressed by Equation(22d):

$$\sum_{i=1}^{I} C_{ij}(S_{ij} + \gamma_i\lambda_{ij} - Y_{ij}) \leq Inv_j,\ \forall_j \quad (22d)$$

where $C_{ij}$ represents a unit cost or total landed cost for part i at location j.

e. The overall inventory investment is less than or equal to an overall inventory investment limit Inv, which may be expressed by Equation (22e):

$$\sum_{i=1}^{I} C_{ij}X_{ij} \leq Inv \quad (22e)$$

f. The overall inventory cost based on safety stock $SS_{ij}$ is less than or equal to overall budget B, which may be expressed by Equation (22f):

$$\sum_{t=1}^{N}\sum_{j=1}^{J}\sum_{i=1}^{I} [h_{ij}SS_{ijt} + bp_{ij}EBO_{ijt} + k_{ij}\lambda_{ijt}] + \sum_{j=1}^{J}\sum_{i=0}^{I} C_{ij}X_{ij} \leq B \quad (22f)$$

where $h_{ij}$ represents a holding cost of part i at location j, $SS_{ijt}=(S_{ijt}-\mu_{ijt})^+$, $bp_{ij}$ represents a backorder penalty cost of part i a location j, and $k_{ij}$ represents an order cost for part i at location j.

If the inventory cost is based on stock level, then it may be expressed by Equation (22fi):

$$\sum_{t=1}^{N}\sum_{j=1}^{J}\sum_{i=1}^{I}[h_{ij}S_{ijt}+bp_{ij}EBO_{ijt}+k_{ij}\lambda_{ijt}]+\sum_{j=1}^{J}\sum_{i=1}^{I}C_{ij}X_{ij}\leq B \tag{22fi}$$

g. The cost at each location j based on safety stock is less than or equal to a budget $B_j$ at location j, which may be expressed by Equation (22g):

$$\sum_{t=1}^{N}\sum_{i=1}^{I}[h_{ij}SS_{ijt}+bp_{ij}EBO_{ijt}+k_{ij}\lambda_{ijt}]+\sum_{i=1}^{I}C_{ij}X_{ij}\leq B_j,\ \forall_j \tag{22g}$$

If the cost is based on stock level, then it may be expressed by Equation (22g)i:

$$\sum_{t=1}^{N}\sum_{i=1}^{I}h_{ij}S_{ijt}+bp_{ij}EBO_{ijt}+k_{ij}\lambda_{ijt}+\sum_{i=1}^{I}C_{ij}X_{ij}\leq B_j,\ \forall_j \tag{22gi}$$

h. The total volume occupied by parts at each location j is less than or equal to the volume capacity limit $V_j$ at location j, which may be expressed by Equation (22h):

$$\sum_{i=1}^{I}v_iS_{ijt}\leq V_j,\ \forall_j,\ \forall_t \tag{22h}$$

i. The total weight occupied by parts at each location j is less than or equal to the weight capacity limit $W_j$ at location j, which may be expressed by Equation (22i):

$$\sum_{i=1}^{I}w_iS_{ijt}\leq W_j,\ \forall_j,\ \forall_t \tag{22i}$$

j. The stock levels $S_{ijt}$ are integers, which may be expressed by Equation (22j):

$$S_{ijt}\text{ are integers} \tag{22j}$$

k. The maximum stock levels $S_{ij}$ are integers, which may be expressed by Equation (22k):

$$S_{ij}\text{ are integers} \tag{22k}$$

At step 150, the coverage function is converted to a Backorder function that corresponds to expected backorders, and the constraints are expressed in terms of backorders. Using the backorder function may provide for a simpler optimization process. The backorder function may be expressed by Equation (23):

$$\sum_{t=1}^{N}\sum_{j=1}^{J}\sum_{i=1}^{I}EBO_{ijt}(S_{ijt}) \tag{23}$$

Minimizing the backorder function is equivalent to maximizing the coverage function. The constraints may be expressed by Equations (23a):

$$S_{ijt}\geq S_{ijt}^{M},\ \forall_i,\ \forall_j,\ \forall_t \tag{23a}$$

$$S_{ijt}\leq S_{ij},\ \forall_j,\ \forall_t$$

$$\sum_{i=1}^{I}EBO_{ijt}(S_{ijt})\leq(1-\omega_j)\sum_{i=1}^{I}\mu_{ijt},\ \forall_j,\ \forall_t$$

$$X_{ij}\geq S_{ij}+[\gamma_i\lambda_{ij}-Y_{ij}],\ \forall\ i$$

$$\sum_{t=1}^{N}\sum_{j=1}^{J}\sum_{i=1}^{I}[h_{ij}SS_{ijt}+bp_{ij}EBO_{ijt}+k_{ij}\lambda_{ijt}]+\sum_{j=1}^{J}\sum_{i=1}^{I}C_{ij}X_{ij}\leq B$$

$$\sum_{t=1}^{N}\sum_{i=1}^{I}[h_{ij}SS_{ijt}+bp_{ij}EBO_{ijt}+k_{ij}\lambda_{ijt}]+\sum_{i=1}^{I}C_{ij}X_{ij}\leq B_j,\ \forall_j$$

$$\sum_{i=1}^{I}v_iS_{ijt}\leq V_j,\ \forall_j,\ \forall_t$$

$$\sum_{i=1}^{I}w_iS_{ijt}\leq W_j,\ \forall_j,\ \forall_t$$

$$S_{ijt}\text{ are integers}$$

$$S_{ij}\text{ are integers}$$

where $S_{ijt}^{M}$ represents the minimum stock level that guarantees the minimum target coverage.

The high degree of non-linearity of the constraints may be reduced by replacing the minimum target coverage constraint for each part at each location expressed by Equation (22b) with an equivalent constraint expressed as $S_{ijt}\geqq S_{ijt}^{M}$, $\forall_i$, $\forall_j$, $\forall_t$. The definition of the number of new purchases expressed by Equation (22ciii) may be replaced with a relaxed constraint expressed as $X_{ij}\geqq S_{ij}+[\gamma_i\lambda_{ij}-Y_{ij}]$, $\forall$i.

Maximization of the coverage function may be shown to be equivalent to minimizing the backorder function. The weighted average of coverage for supply chain network 20 may be expressed by Equation (23b):

$$\sum_{t=1}^{N}\sum_{j=1}^{J}\sum_{i=1}^{I}\beta_{ijt}\theta_{ijt}(S_{ijt}) \tag{23b}$$

where $\theta_{ijt}(S_{ijt})$ represents the coverage for part i at location j for time period t defined by Equation (23c):

$$\theta_{ijt}(S_{ijt})=\left\{\sum_{x=0}^{S_{ijt}}xP(x\mid\mu_{ijt})+\chi\sum_{x=S_{ij}+1}^{\infty}S_{ijt}P(x\mid\mu_{ijt})\right\}\Big/\mu_{ijt} \tag{23c}$$

The backorder function describes the total expected number of backorders for supply chain network 20 and may be expressed by Equation (23d):

$$\sum_{t=1}^{N}\sum_{j=1}^{J}\sum_{i=1}^{I}EBO_{ijt}(S_{ijt}) \tag{23d}$$

The following proposition may be established:

Proposition 1: Vector $S_{jt}(S_{1jt},\ldots,S_{Ijt})$ satisfies the performance constraint expressed by Equation (23e):

$$\sum_{j=1}^{J}\sum_{i=1}^{I}\mu_{ijt}\theta_{ijt}(S_{ijt}) \geq \omega_j\sum_{i=1}^{I}\mu_{ijt},\ \forall_t \tag{23e}$$

if and only if vector $S_{jt}$ satisfies an expected backorders constraint expressed by Equation (23f):

$$\sum_{j=1}^{J}\sum_{i=1}^{I}EBO_{ijt}(S_{ijt}) \leq (1-\omega_j)\sum_{i=1}^{I}\mu_{ijt},\ \forall_t \tag{23f}$$

A relationship between expected backorder $EBO_{ij}(S_{ij})$ and performance $\theta_{ij}(S_{ij})$ may be established according to Equations (23g):

$$\theta_{ijt}(S_{ijt}) = \left\{\mu_{ijt} - \sum_{x=S_{ijt}+1}^{\infty} xP\langle x\mid\mu_{ijt}\rangle + \chi\sum_{x=S_{ijt}+1}^{\infty} S_{ijt}P\langle x\mid\mu_{ijt}\rangle\right\}\Big/\mu_{ijt} \tag{23g}$$

$$\theta_{ijt}(S_{ijt}) = \left\{\mu_{ijt} - \sum_{x=S_{ijt}}^{\infty}(x-\chi S_{ijt})P\langle x\mid\mu_{ijt}\rangle\right\}\Big/\mu_{ijt}$$

$$\theta_{ijt}(S_{ijt}) = \{\mu_{ijt} - EBO_{ijt}(S_{ijt})\}/\mu_{ijt}$$

$$\theta_{ijt}(S_{ijt})1 - \{EBO_{ijt}(S_{ijt})\}/\mu_{ijt}$$

$$EBO_{ijt}(S_{ijt}) = \mu_{ijt}[1-\theta_{ijt}(S_{ijt})]$$

For any set of $S_{ij}$ that satisfies the performance constraint expressed by Equation (23f), the following Equations (23h) may be shown:

$$\sum_{i=1}^{I}EBO_{ijt}(S_{ijt}) \leq (1-\omega_j)\sum_{i=1}^{I}\mu_{ijt},\ \forall_t \tag{23h}$$

$$\sum_{i=1}^{I}\mu_{ijt} - \sum_{i=1}^{I}\mu_{ijt}\theta_{ijt}(S_{ijt}) \leq \sum_{i=1}^{I}\mu_{ijt} - \omega_j\sum_{i=1}^{I}\mu_{ijt},\ \forall_t$$

$$-\sum_{i=1}^{I}\mu_{ijt}\theta_{ijt}(S_{ijt}) \leq -\omega_j\sum_{i=1}^{I}\mu_{ijt},\ \forall_t$$

$$\sum_{i=1}^{I}\mu_{ijt}\theta_{ijt}(S_{ijt}) \geq \omega_j\sum_{i=1}^{I}\mu_{ijt},\ \forall_t$$

The stock level $S_{ijt}$ in question satisfies the location performance constraint expressed by Equations (23g). The steps may be reversed to prove the converse.

The following proposition describing the relationship between performance and coverage may be established:

Proposition: Maximizing system-wide coverage is equivalent to minimizing the total system-wide backorders.

The proposition may be established according to Equations (23i):

Maximize $$\sum_{t=1}^{N}\sum_{j=1}^{J}\sum_{i=1}^{I}\mu_{ijt}\theta_{ijt}(S_{ijt}) = \sum_{t=1}^{N}\sum_{j=1}^{J}\sum_{i=1}^{I}\mu_{ijt} - EBO_{ijt}(S_{ijt}) \tag{23i}$$

-continued $$\sum_{t=1}^{N}\sum_{j=1}^{J}\sum_{i=1}^{I}\mu_{ijt} - \sum_{t=1}^{N}\sum_{j=1}^{J}\sum_{i=1}^{I}EBO_{ijt}(S_{ijt}) = -\left[\sum_{t=1}^{N}\sum_{j=1}^{J}\sum_{i=1}^{I}EBO_{ijt}(S_{ijt})\right] + \sum_{t=1}^{N}\sum_{j=1}^{J}\sum_{i=1}^{I}\mu_{ijt}$$

$$\text{Maximize} - \left[\sum_{t=1}^{N}\sum_{j=1}^{J}\sum_{i=1}^{I}EBO_{ijt}(S_{ijt})\right] + \sum_{t=1}^{N}\sum_{j=1}^{J}\sum_{i=1}^{I}\mu_{ijt} = \text{Minimize}\left[\sum_{t=1}^{N}\sum_{j=1}^{J}\sum_{i=1}^{I}EBO_{ijt}(S_{ijt})\right]$$

At step 154, the objective function that measures expected backorder as expressed by Equation (23) may be linearized. To linearize the objective function and constraints, the non-linear terms of the objective function and constraints may be approximated by linear terms. The non-linear terms are discrete and convex, so a first-order linear approximation using the finite difference for two neighboring discontinuous points may be used to approximate each non-linear term. Each non-linear term in the objective function and the constraints is replaced with a continuous variable $t_{ijt}$, and a linearization constraint that describes the under estimation at points of discontinuity is added to the constraints. The linearized objective function may be expressed by Equation (24):

$$\sum_{t=1}^{N}\sum_{j=1}^{J}\sum_{i=1}^{I}t_{ijt} \tag{24}$$

The linearization constraint may be expressed by Equation (25):

$$t_{ijt} \geqq m_{ijt}(x-x_{ijt})+b_{ijt},\ \forall S_{ijt} < x_{ijt} \leqq S_{upper},\ \forall_{i,j,t} \tag{25}$$

where $m_{ijt}=P(x>x_{ijt}|\mu_{ijt})$, $b_{ijt}=P(x>x_{ijt}|\mu_{ijt})(x-x_{ijt})+EBO_{ijt}(x_{ijt}+1)$, and $S_{upper}$ is the upper bound on the inventory for part i at location j for time period t.

Other constraints may be expressed by Equations (25a):

$$S_{ijt} \geq S_{ijt}^{M},\ \forall_i = 1, \ldots, I_1,\ \forall_j,\ \forall_t \tag{25a}$$

$$\left[\sum_{i=1}^{I}\sum_{x=0}^{S_{ijt}}[x-\chi S_{ijt}]P\langle x\mid\mu_{ijt}\rangle + \chi S_{ijt}\right]\Big/\sum_{i=1}^{I}\mu_{ijt} \geq \omega_j,\ \forall_j,\ \forall_t$$

$$\sum_{t=1}^{N}\sum_{j=1}^{J}\sum_{i=1}^{I}[h_{ij}SS_{ijt} + bp_{ij}t_{ijt} + k_{ij}\lambda_{ijt}] + \sum_{j=1}^{J}\sum_{i=1}^{I}C_{ij}X_{ij} \leq B$$

$$\sum_{t=1}^{N}\sum_{i=1}^{I}[h_{ij}SS_{ijt} + bp_{ij}t_{ijt} + k_{ij}\lambda_{ijt}] + \sum_{i=1}^{I}C_{ij}X_{ij} \leq B_j,\ \forall_j$$

$$\sum_{j=1}^{J}\sum_{i=1}^{I}C_{ij}X_{ij} \leq Inv$$

$$\sum_{i=1}^{I}C_{ij}X_{ij} \leq Inv_j,\ \forall_j$$

-continued $$\sum_{i=1}^{I} v_i S_{ijt} \le V_j, \forall_j, \forall_t$$

$$\sum_{i=1}^{I} w_i S_{ijt} \le W_j, \forall_j, \forall_t$$

$$S_{ijt} \text{ are integers } \forall_i = 1, \ldots, I_2, \forall_j, \forall_t$$

$$S_{ij} \text{ are integers } \forall_i = 1, \ldots, I_2, \forall_j$$

After linearizing, deployment module 40 solves the resulting mixed integer programming problem and determines the optimal stock levels for each part at each location.

An objective function measuring the system-wide total cost may also be defined at step 154. The total cost function may be expressed by Equation (25b):

$$\sum_{t=1}^{N}\sum_{j=1}^{J}\sum_{i=1}^{I}[h_{ij}SS_{ijt} + bp_{ij}EBO_{ijt} + k_{ij}\lambda_{ijt}] + \sum_{j=1}^{J}\sum_{i=1}^{I}C_{ij}X_{ij} \quad (25b)$$

The constraints for the total cost function may be expressed by Equations (25c):

$$S_{ijt} \ge S_{ijt}^{M}, \forall_i = 1, \wedge, I, \forall_j, \forall_t \quad (25c)$$

$$\left[\sum_{i=1}^{I}\left\{\sum_{x=0}^{S_{ijt}}[x - \chi S_{ijt}]P\langle x \mid \mu_{ijt}\rangle + \chi S_{ijt}\right\}\right] \Big/ \sum_{i=1}^{I}\mu_{ijt} \ge \omega_j,$$

$$\forall_j, \forall_t$$

$$X_{ij} \ge S_{ij} + [\gamma_i\lambda_{ij} - Y_{ij}], \forall_i = 1, \ldots, I$$

$$\sum_{i=1}^{I} v_i S_{ijt} \le V_j, \forall_j, \forall_t$$

$$S_{ijt} \text{ are integers } \forall_i = 1, \ldots, I, \forall_j, \forall_t$$

$$S_{ij} \text{ are integers } \forall_i = 1, \ldots, I, \forall_j$$

The total cost function and the constraints may also be linearized at step 154 in order to allow the objective function to be optimized by solver 39. The total cost objective function, as expressed by Equation (25b), may be linearized according to Equation (25d):

$$\sum_{t=1}^{N}\sum_{j=1}^{J}\sum_{i=1}^{I}[h_{ij}SS_{ijt} + bp_{ij}t_{ijt} + k_{ij}\lambda_{ijt}] + \sum_{j=1}^{J}\sum_{i=1}^{I}C_{ij}X_{ij} \quad (25d)$$

The constraints may be linearized according to Equations (25e):

$$t_{ijt} \ge m_{ijt}(S - x_{ijt}) + b_{ijt}, \forall S_{ijt} < x_{ijt} \le S_{upper}, \quad (25e)$$

$$S_{ijt} \ge S_{ijt}^{M}, \forall_i = 1, \wedge, I_1, \forall_j, \forall_t$$

$$\sum_{i=1}^{I} t_{ijt} \ge (1 - \omega_j)\sum_{i=1}^{I}\mu_{ijt}, \forall_j, \forall_t$$

$$S_{ijt} \le S_{ij}, \forall_i, \forall_j, \forall_t$$

-continued $$X_{ij} \ge S_{ij} + [\gamma_i\lambda_{ij} - Y_{ij}], \forall i = 1, \ldots, I$$

$$\sum_{i=1}^{I_1} v_i S_{ijt} \le V_j, \forall_j, \forall_t$$

$$\sum_{i=1}^{I_1} w_i S_{ijt} \le W_j, \forall_j, \forall_t$$

$$S_{ijt} \text{ are integers } \forall_i = 1, \ldots, I_2, \forall_j, \forall_t$$

$$S_{ij} \text{ are integers } \forall_i, \forall_j$$

After linearizing, deployment module 40 solves the resulting mixed integer-programming problem and determines the optimal stock levels for each part at each location.

In accordance with the principles of embodiments, deployment module 40 solves this nonlinear mixed integer programming problem by linearizing the problem with the introduction of a set of binary variables $Z_{ijt1}, \ldots, Z_{ijtk}$ for each stock level $S_{ijt}$. The relationship between $Z_{ijt1}, \ldots, Z_{ijtk}$ and $S_{ijt}$ may be expressed by Equations (26).

$$\sum_{k=1}^{k_{ijt\max}} S_{ijtk}Z_{ijtk} = S_{ijt} \quad (26)$$

$$\sum_{k=1}^{k_{ijt\max}} Z_{ijtk} = 1$$

$$Z_{ijtk} \in \{0, 1\}$$

$$k_{ijt\max} = (S_{upper} - S_{ijt}^{M})/d$$

$$S_{ijt1} = S_{ijt}^{M}$$

$$S_{ijtk\max} = S_{upper}$$

$$S_{ijt} \in \{S_{ijt1}, S_{ijt1} + d, S_{ijt1} + 2d, \ldots, S_{ijtk\max}\}$$

$$d \text{ is integer}$$

where $S_{ijtk}$ is the stock level corresponding to $k^{th}$ binary variable $Z_{ijtk}$ and d is the stock level integer discretization width.

The stock level discretization width d may be controlled for accuracy and scalability as the increase in d positively influences the scalability and inversely affects the accuracy of the solution. The $EBO_{ijt}(S_{ijt})$ may therefore be expressed in terms of binary variables as in Equation (27):

$$EBO_{ijt}(S_{ijt}) = \sum_{k=1}^{k_{ijt\max}} EBO_{ijtk}(S_{ijtk}) \quad (27)$$

The expected backorder may be calculated for each stock level value $S_{ijtk}$. The objective function in Equation (23i) may therefore be modified with the introduction of the binary variables and may be expressed by Equation (28):

$$\text{Minimize}\sum_{t=1}^{N}\sum_{j=1}^{J}\sum_{i=1}^{I}\sum_{k=1}^{k_{ijt\max}} EBO_{ijt}(S_{ijt}) \quad (28)$$

The constraints with the introduction of binary variables may be expressed by Equations (28a):

$$S_{ijt} \geq S_{ijt}^{M}, \forall_i, \forall_j, \forall_t \tag{28a}$$

$$\sum_{k=1}^{k_{ijt\max}} S_{ijtk} Z_{ijtk} = S_{ijt}$$

$$\sum_{k=1}^{k_{ijt\max}} Z_{ijtk} = 1$$

$$S_{ijt} \leq S_{ij}, \forall_j, \forall_t$$

$$\sum_{i=1}^{I} \sum_{k=1}^{k_{ijt\max}} Z_{ijtk} EBO_{ijtk}(S_{ijtk}) \leq (1-\omega_j) \sum_{i=1}^{I} \mu_{ijt}, \forall_j, \forall_t$$

$$X_{ij} \geq S_{ij} + [\gamma_i \lambda_{ij} - Y_{ij}], \forall_i$$

$$\sum_{t=1}^{N} \sum_{j=1}^{J} \sum_{i=1}^{I} \left[ \left( \sum_{k=1}^{k_{ijt\max}} Z_{ijtk}(h_{ij} S_{ijtk} + bp_{ij} EBO_{ijtk}) \right) + k_{ij} \lambda_{ijt} \right] + \sum_{j=1}^{J} \sum_{i=1}^{I} C_{ij} X_{ij} \leq B$$

$$\sum_{t=1}^{N} \sum_{i=1}^{I} \left[ \left( \sum_{k=1}^{k_{ijt\max}} Z_{ijtk}(h_{ij} S_{ijtk} + bp_{ij} EBO_{ijtk}) \right) + k_{ij} \lambda_{ijt} \right] + \sum_{i=1}^{I} C_{ij} X_{ij} \leq B_j, \forall_j$$

$$\sum_{i=1}^{I} \sum_{k=1}^{k_{ijt\max}} Z_{ijtk} v_i S_{ijtk} \leq V_j, \forall_j, \forall_t$$

$$\sum_{i=1}^{I} \sum_{k=1}^{k_{ijt\max}} Z_{ijtk} w_i S_{ijtk} \leq V_j, \forall_j, \forall_t$$

$$Z_{ijtk} \in \{0, 1\}$$

$$S_{ijt1} = S_{ijt}^{M}$$

$$S_{ijtk\max} = S_{upper}$$

$$k_{ijt\max} = (S_{ijtk\max} - S_{ijt1}) / d$$

$$S_{ijt} \in \{S_{ijt1}, S_{ijt1} + d, S_{ijt1} + 2d, \ldots, S_{ijtk\max}\}$$

$$S_{ijt} \text{ are integers}$$

$$S_{ij} \text{ are integers}$$

Deployment module 40 solves the resulting problem and determines the stock level binary variable that has the value of 1. The corresponding stock level $S_{ijtk}$ can be identified, which is also $S_{ijt}$.

A similar approach can be used for the cost function and Equation (25b) may be modified as in the following Equation (29):

$$\sum_{t=1}^{N} \sum_{j=1}^{J} \sum_{i=1}^{I} \left[ \left( \sum_{k=1}^{k_{ijt\max}} Z_{ijtk}(h_{ij} S_{ijtk} + bp_{ij} EBO_{ijtk}) \right) + k_{ij} \lambda_{ijt} \right] + \sum_{j=1}^{J} \sum_{i=1}^{I} C_{ij} X_{ij} \tag{29}$$

The constraints for the modified total cost function may be expressed by the Equations (29a):

$$S_{ijt} \geq S_{ijt}^{M}, \forall_i, \forall_j, \forall_t \tag{29a}$$

$$\sum_{k=1}^{k_{ijt\max}} S_{ijtk} Z_{ijtk} = S_{ijt}$$

$$\sum_{k=1}^{k_{ijt\max}} Z_{ijtk} = 1$$

$$S_{ijt} \leq S_{ij}, \forall_j, \forall_t$$

$$\sum_{i=1}^{I} \sum_{k=1}^{k_{ijt\max}} Z_{ijtk} EBO_{ijtk}(S_{ijtk}) \leq (1-\omega_j) \sum_{i=1}^{I} \mu_{ijt}, \forall_j, \forall_t$$

$$X_{ij} \geq S_{ij} + [\gamma_i \lambda_{ij} - Y_{ij}], \forall_i$$

$$\sum_{i=1}^{I} \sum_{k=1}^{k_{ijt\max}} Z_{ijtk} v_i S_{ijtk} \leq V_j, \forall_j, \forall_t$$

$$\sum_{i=1}^{I} \sum_{k=1}^{k_{ijt\max}} Z_{ijtk} w_i S_{ijtk} \leq V_j, \forall_j, \forall_t$$

$$Z_{ijtk} \in \{0, 1\}$$

$$S_{ijt1} = S_{ijt}^{M}$$

$$S_{ijtk\max} = S_{upper}$$

$$k_{ijt\max} = (S_{ijtk\max} - S_{ijt1}) / d$$

$$S_{ijt} \in \{S_{ijt1}, S_{ijt1} + d, S_{ijt1} + 2d, \ldots, S_{ijtk\max}\}$$

$$S_{ijt} \text{ are integers}$$

$$S_{ij} \text{ are integers}$$

In accordance with the principles of embodiments, this approach provides for a more scalable and accurate solution depending on the stock level discretization width and may be more suitable for parts with low demand or those parts that are categorized as slow movers.

In addition, or as an alternative, deployment module 40 may be used for inventory deployment of parts using a marginal approach. Deployment module 40 may use optionally a marginal analysis for parts having high or seasonally varying demands, to solve the problem by making trade-offs between different parts at a location. The marginal analysis for minimizing the expected backorders is done by using a heuristic that determines the most beneficial part by incrementing the stock level and analyzing the ratio of the change in expected backorders to the weighted sum of change in cost, space and weight depending upon the constraints.

Figure 8:
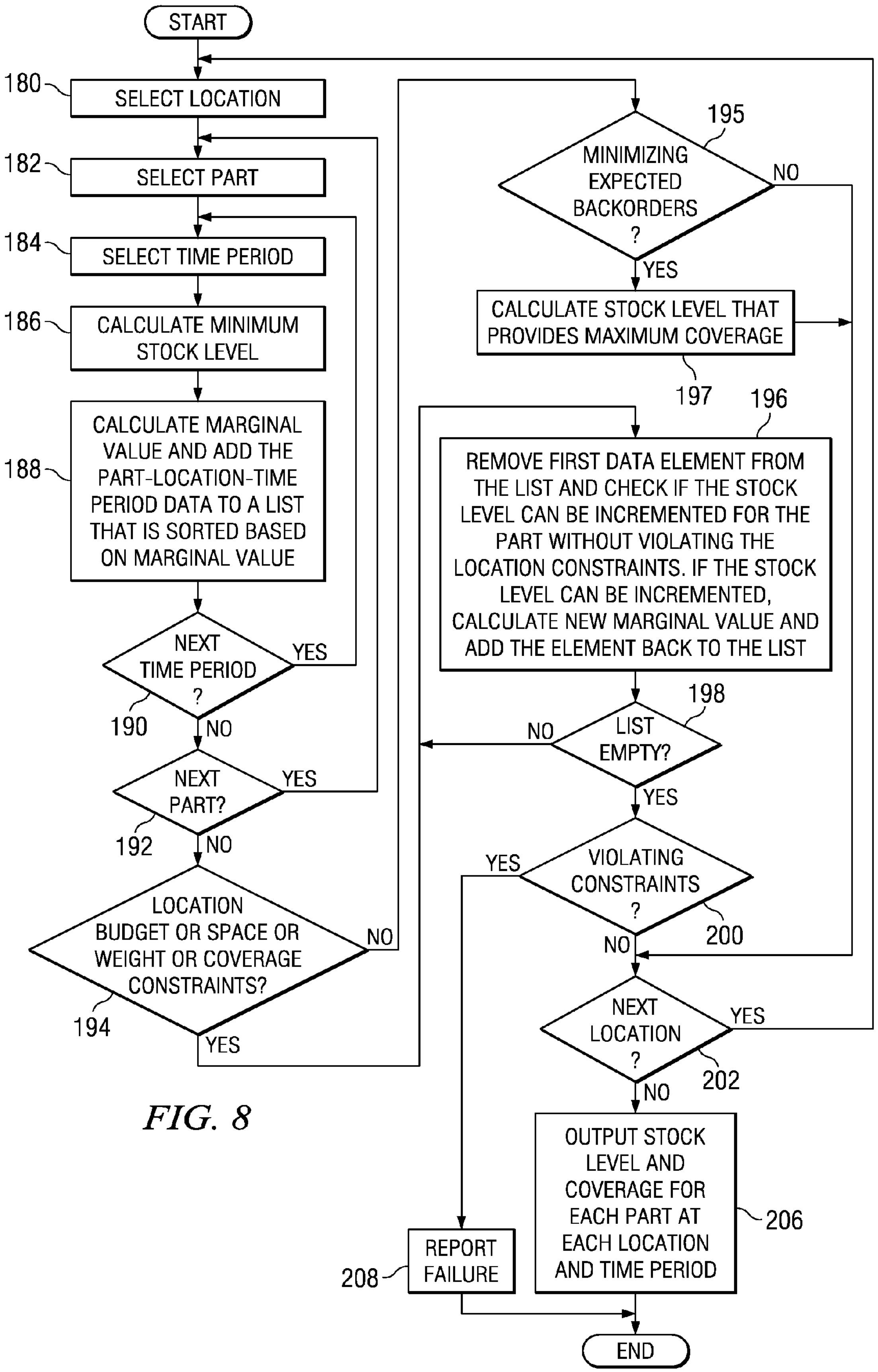
FIG. 8 illustrates an example method for determining a stock level for one or more parts at one or more locations using marginal analysis.

FIG. 8 illustrates an example method for determining a stock level for one or more parts at one or more locations 22 using marginal analysis. Deployment module 40 initiates the method at step 180 by selecting a location 22. At step 182, a part i is selected. At step 184, a time period t is selected, starting with the first time period. At step 186, a minimum stock level is calculated that satisfies the coverage target for the selected part. At step 188, a marginal value corresponding to the minimum stock level is determined for the part and the part-location-time period data is added to a list. The list is sorted based on the marginal value whenever a new element is added. The sorting order of the list depends on whether the optimization problem is for minimizing the expected backorder or for minimizing the cost. The marginal value for minimizing the backorder may be determined by Equation (30):

$$M_{ijtk}^{ebo} = \frac{\beta_i \Delta EBO_{ijtk}}{\frac{\Delta OC_{ijtk}}{B} + \xi \frac{\Delta V_{ik}}{V_j} + \psi \frac{\Delta W_{ik}}{W}} \tag{30}$$

where $\Delta EBO_{ijtk}$, $\Delta OC_{ijtk}$, $\Delta V_{ik}$, $\Delta Wi_k$ are change in expected backorder, change in overall cost, change in volume, and change in weight respectively when the stock level $S_{ijtk}$ is incremented by the discretization width d. The overall cost may include, for example, purchase, holding, order, back order penalty, and/or any other cost associated with the item as determined from time to time.

$\xi$ and $\psi$ represent binaries for volume and weight constraints respectively.

The marginal analysis for minimizing the cost may be accomplished by using a heuristic that determines the most beneficial part by incrementing the stock level and analyzing the ratio of the change in cost to the change in expected back orders. The marginal heuristics may change from time to time to account for different characteristics of the problem, but, the underlying principle, that is, the use of marginal value for solving the inventory deployment or redistribution problem remains the same.

It can be shown from Equation (7) that, as the stock level tends to increase, the expected backorders tend to decrease. Therefore, a part that has the highest negative change in expected backorders with respect to the investment for a given discretization width, is a suitable one to minimize the overall expected backorders. The list at step 188 is therefore sorted in an increasing order for minimizing the expected backorders and the reverse for minimizing the cost. At step 190, deployment module 40 returns to step 184, if a next time period is found. The process is repeated for all time periods. At step 192, deployment module 40 checks for a next part at the selected location and if a next part is found, deployment module 40 returns to step 182 and the process is repeated for all parts at the selected location. At step 194, deployment module 40 determines whether the location has one or more constraints such as, for example, budget, volume, weight and coverage. If constraints are found, deployment module 40 proceeds with step 196, otherwise deployment module 40 proceeds with step 195.

At step 196, the first data element from the sorted list is removed. If the part in the removed data element does not violate location budget or space or weight constraints as applicable after incrementing its stock level with the discretization width d, the incremented stock level will become the new stock level for the part. If the stock level can be incremented for the part, the new marginal value will be calculated and the part-location-time period data will be added back to the sorted list with its new marginal value. At step 198, deployment module 40 determines whether the list has any data element left. If the list has any element, deployment module 40 returns to step 196 to repeat the process until the list is empty.

Deployment module 40 proceeds to step 200 once the list is empty and at step 200, deployment module 40 determines whether the parts with the new stock levels satisfy the location coverage target constraint or violate any of the location constraints. Deployment module 40 aborts the procedure after reporting the failure at step 208 if deployment module 40 determines that one or more location constraints are violated. Deployment module 40 returns to step 180, if deployment module 40 finds a next location and the process is repeated for all locations. If there is no next location, the resulting stock level and coverage are reported for each part at each location and time period at step 206.

At step 195, deployment module 40 determines whether deployment module 40 is minimizing expected backorders or minimizing cost. If deployment module 40 is minimizing backorders, deployment module 40 proceeds to step 197 to determine the maximum stock level for the maximum possible coverage. If deployment module 40 is minimizing cost, deployment module 40 proceeds to step 206 to output the minimum stock level and coverage determined at step 186 and then the method terminates after step 206.

Figure 9:
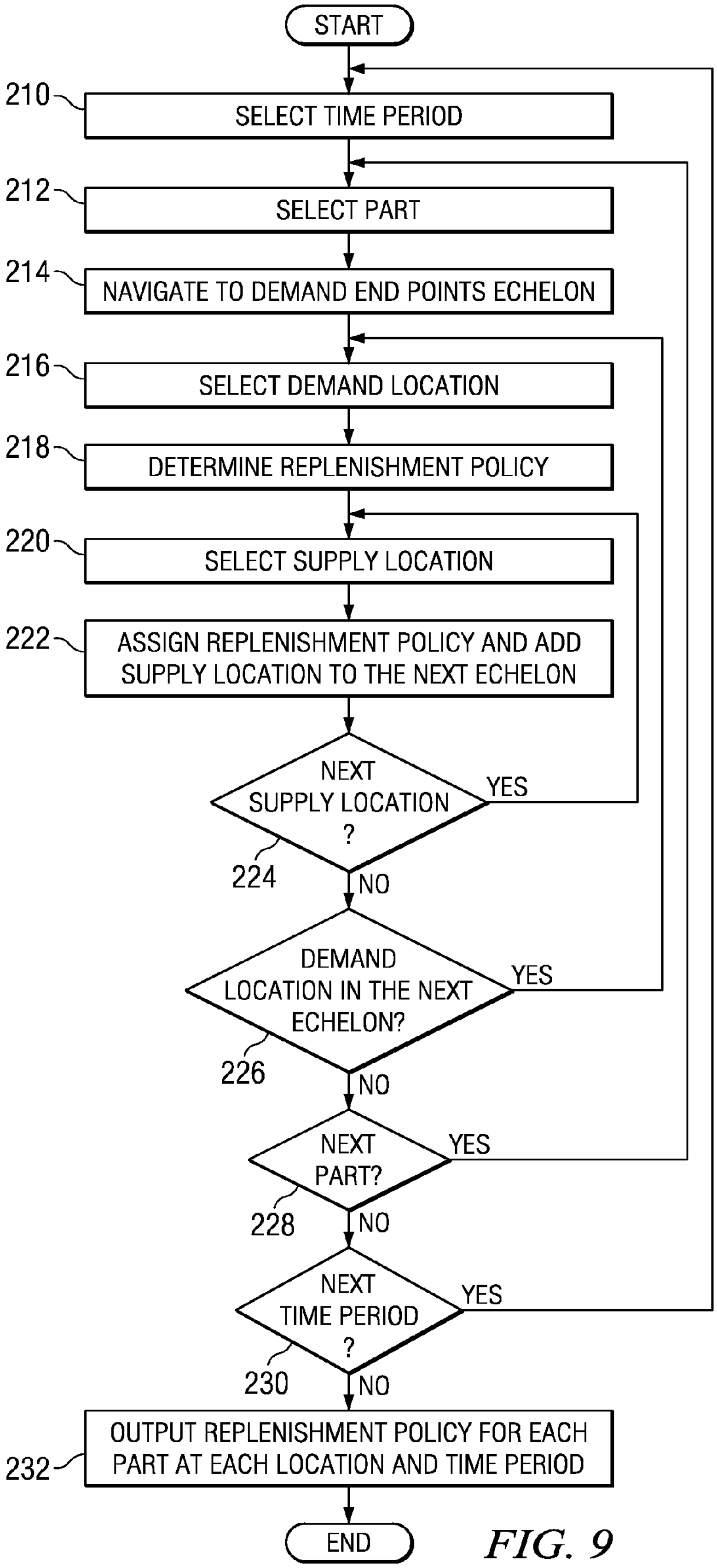
FIG. 9 illustrates an example method for determining a replenishment policy for one or more parts at one or more locations.

FIG. 9 illustrates an example method for determining a replenishment policy for one or more parts at one or more locations 22 and one or more time periods t. Deployment module 40 initiates the method at step 210 by selecting a time period t, starting with the first time period. A part i is selected at step 212. At step 214, all demand endpoints are determined and added into a list and the list is referred to, as the endpoints echelon. Echelon is defined as a group of demand locations positioned at a same level relative to a vendor.

At step 216, a demand location j or channel is selected from the list of demand endpoints list in the echelon. A suitable replenishment policy is determined at step 218, depending on parameters such as, for example, lead-time demand in a demand range, cost of the part in a cost range, order size in order size range and other business rules as defined from time to time for determination of replenishment policies. Replenishment policies may include (S-1,S), (R,Q), and (s,S). S is the stock level or reorder level in (S-1,S) policy, R is the reorder level and Q is the order quantity in (R,Q) policy, and s is the minimum stock level and S is the maximum stock level in (s,S) policy.

At step 220, a supply location is selected for the demand location that was selected in step 216. At step 222, a replenishment policy is assigned to the supply location based on demand, cost, and order size parameters. The supply location is added to a list of locations in the same step. At step 224, deployment module 40 determines if there exists any other supply location that has not been assigned a policy. If a supply location is found, deployment module 40 will proceed to step 220 and the policy assignment process will continue until all the supply locations are assigned a replenishment policy. An echelon list is created at step 222 consisting of supply locations for the demand location that was selected at step 216. One or more locations in this echelon list may be the demand locations and is determined at step 224. If a demand location is found, deployment module 40 proceeds to step 216. If a demand location has a policy that was assigned at step 222, the assigned policy is reviewed and final determination is made at step 218. The process is repeated until all the demand locations are processed. At step 228 and 230, deployment module 40 determines if the process has to be repeated for the next part and time period respectively. At step 232, the method is terminated.

Figure 10:
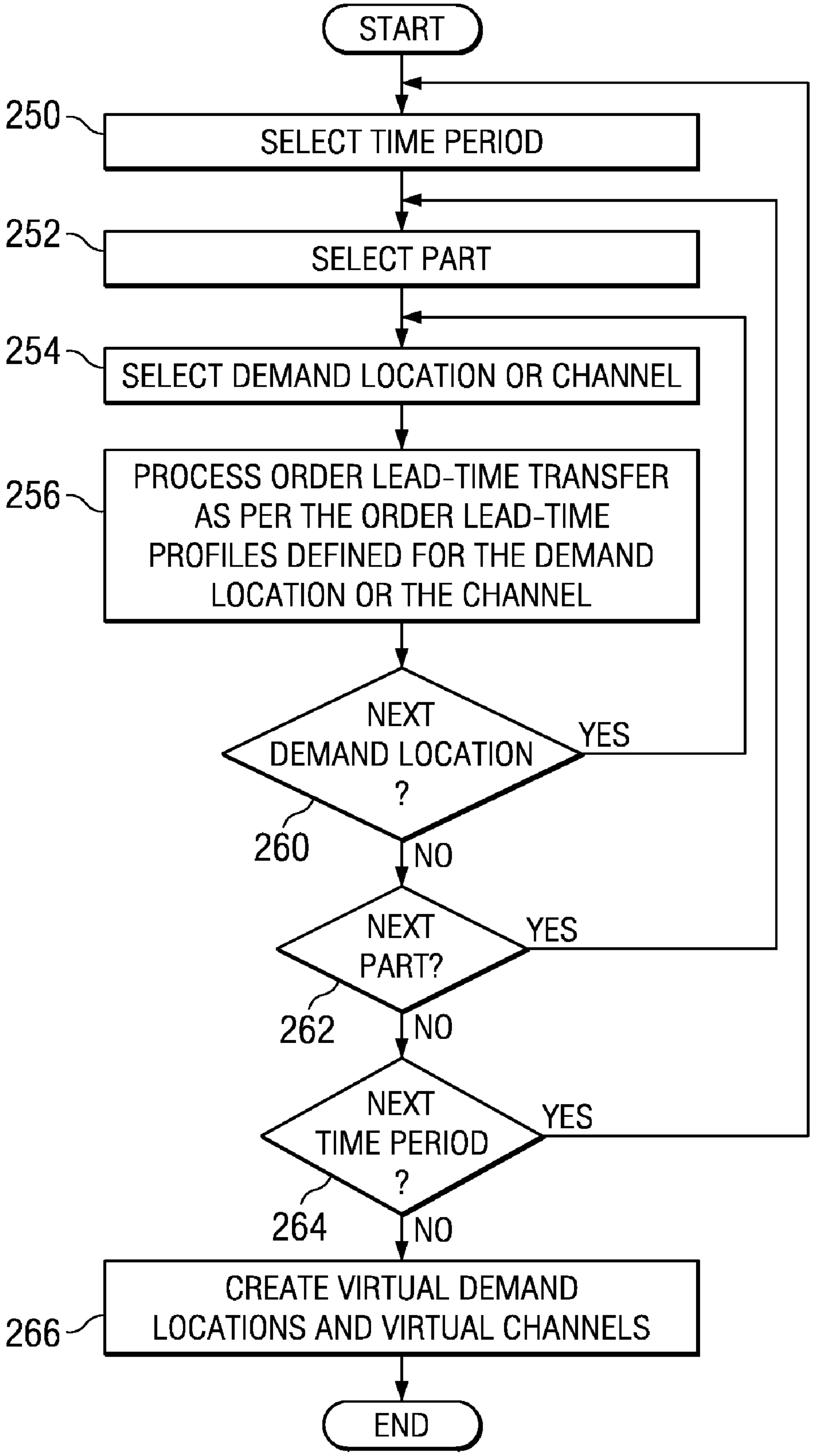
FIG. 10 illustrates an example method for generating a demand transfer based on order lead-time profile for one or more parts at one or more locations.

FIG. 10 illustrates an example method for determining a demand transfer from a demand location or a channel to one or more supply locations, based on one or more order lead-time profiles defined at the demand location or the channel. Deployment module 40 initiates the method at step 250, by selecting a time period t, starting with the first time period. A part i is selected at step 252, and a demand location 22 or channel 31 is selected at step 254. At step 256, deployment module 40 reads the order lead-time profiles defined at the demand location or the channel that was selected at step 254. An order lead-time profile includes a percentage of demand and an available order lead-time.

Deployment module 40 determines a supply location 22 in the supply chain network 20 by traversing locations 22 towards the supply endpoint for each order lead-time profile. Deployment module 40 starts with a supply location that supplies the part to the demand location and calculates the available order lead-time at the supply location by, for example, deducting the supply lead-time from the available order lead-time at the demand location. If the available order lead-time at the supply location is a positive number, deployment module 40 transfers the demand from the demand location to the supply location proportional to supply location's fill probability to the demand location. In the next iteration, deployment module 40 treats the supply location as the demand location with the calculated availability order lead-time as its available order lead-time. The iterations are repeated until the available order lead-time at any demand location is zero or insufficient to transfer to its supply location. If there are manufacturing locations between the supply and demand locations, then the demand for an end product is converted into a demand for a raw material.

At step 260, deployment module 40 determines if there is a next demand location or channel. If a next demand location is found, deployment module 40 returns to step 260 to repeat the process of order lead-time demand transfer. If a next demand location is not found, deployment module 40 proceeds to step 262 to check if there is a next part. If a next part is found, deployment module 40 returns to step 252 to process the order lead-time transfers for all the demand locations for that part. If a next part is not found, deployment module 40 proceeds to step 264 to check for the next time period. If next time period is found, deployment module 40 returns to step 250, otherwise, deployment module 40 proceeds to step 266 to create virtual locations or channels for the transferred demands. The method terminates after step 266.

Figure 11:
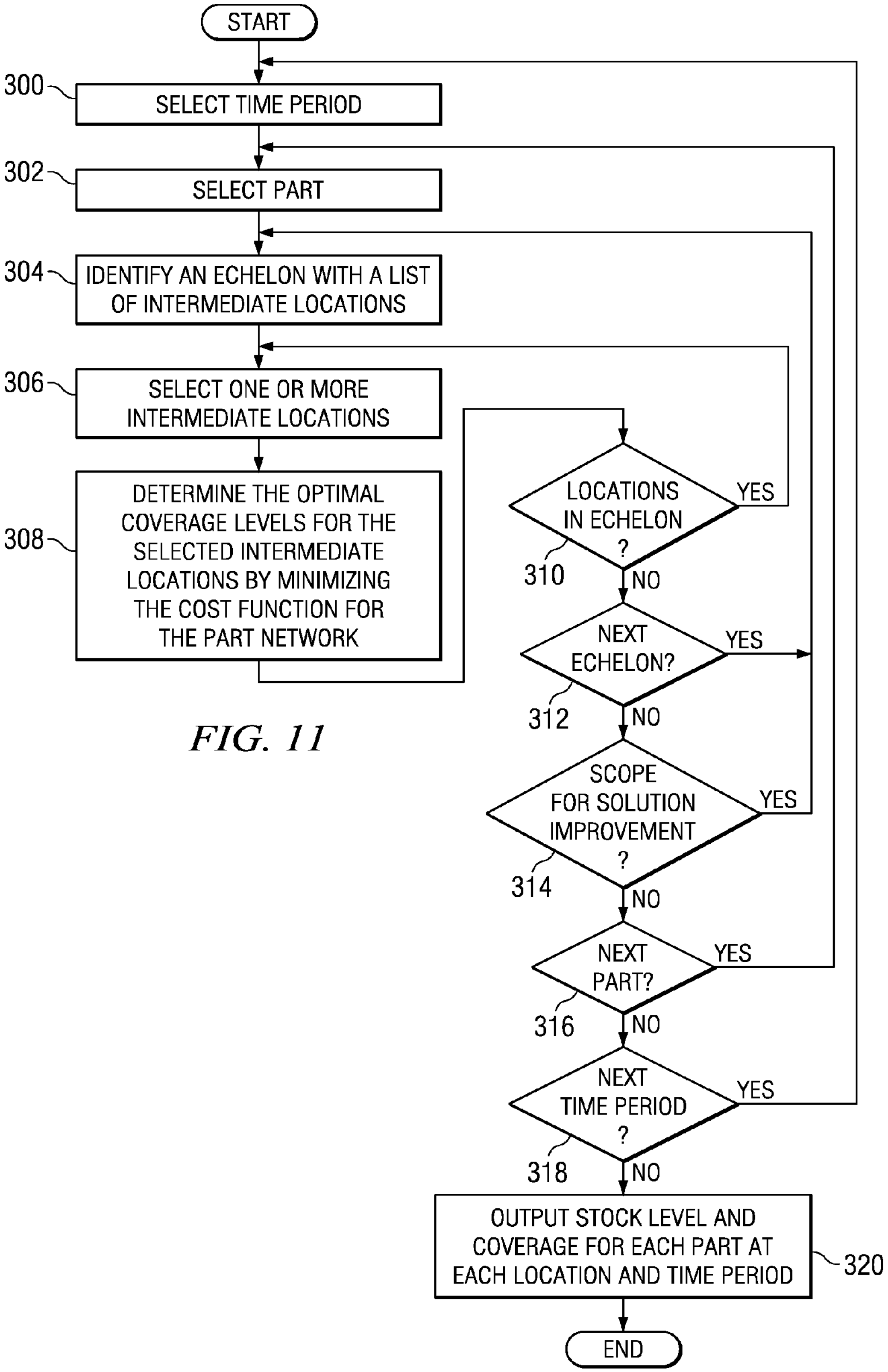
FIG. 11 illustrates an example method for determining optimal coverage levels for intermediate locations.

FIG. 11 illustrates an example method for determining optimal coverage levels for intermediate locations. Deployment module 40 initiates the method at step 300 by selecting a time period t, starting with the first time period. A part i is selected at step 302. At step 304, deployment module 40 identifies an echelon with a set of intermediate locations that supply parts to demand endpoints, or channels. At step 306, one or more locations 22 are selected for determining their coverage levels. At step 308, optimal coverage levels for the selected locations are determined by varying the coverage between minimum and maximum specified coverage levels and minimizing the total network cost function for each coverage level. For example, the optimal coverage may be the coverage at which the total network cost is the least value. The minimum total network cost is determined by using binary or linear search algorithms for the coverage.

At step 308, deployment module 40 determines if there are locations for which the coverage levels are not determined. If the locations are found, deployment module 40 returns to step 306 until all the locations in the echelon are processed. At step 310, deployment module 40 determines if there is a next echelon with a set of locations that supplies parts to locations which were processed earlier. If the next echelon is found, deployment module 40 returns to step 304, until all the echelons are processed. At step 314, deployment module 40 determines if there is any scope for solution improvement by analyzing the minimum total network cost. If the scope for improvement is found, deployment module 40 returns to step 304, to start the next iteration. The process is repeated until there is no scope for improvement. At step 316, deployment module 40 determines if there is a next part and if found, returns to step 302, to process the next part. At step 318, deployment module 40 determines whether there is a next time period t. If a next time period is found, deployment module 40 returns to step 300, otherwise deployment module 40 proceeds to step 320 to output the coverage and stock level for each part at each location and time period.

Figure 12:
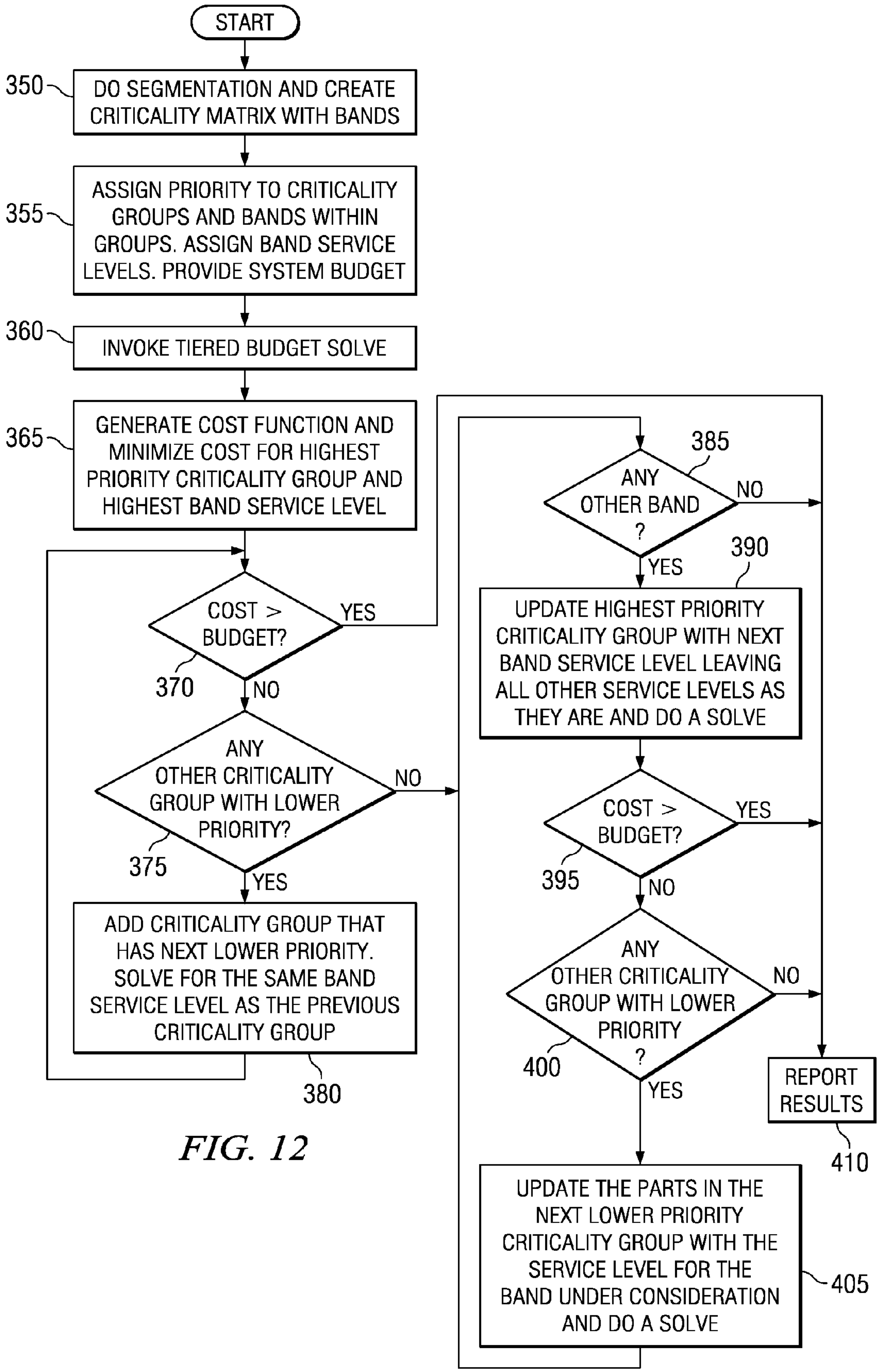
FIG. 12 illustrates an example method for solving parts using priority based criticality grouping of parts and service level bands.

FIG. 12 illustrates an example method for solving parts that belong to one or more priority based criticality groups with coverage or service level bands and a budget constraint for all the parts. At step 350, deployment module 40 defines segmentation of data and a criticality group of parts. For example, segmentation means grouping of parts or parts at locations 22 or channels 31 based on one or more attributes. As an example only and not by way of limitation, channels 31 may be segmented based on their demand and classified based on the demand ranges.

A channel with a demand between 0-100 may be classified as "Low" and a channel with a demand above 100 may be classified as "High". In addition, other attributes that may be used to segment the data may be demand volume, revenue, margin, hub agreement, channel name or a combination of the attributes. A criticality group may be built on top of the segmentation. For example, "High" demand and "High" margin parts may form a criticality group "A". The service level bands for each criticality group may be described as "Must Have Service Level", "Target Service Level", and "Nice to Have Service Level", with each one associated with a coverage in an increasing order. At step 355, priorities are assigned to criticality groups and service level bands. The service levels are assigned to each band and the available budget for all the parts is defined. For example, a purpose for the budget may be for one or more costs associated with the inventory deployment such as purchase cost of a part, holding cost, handling cost, transportation cost, process cost or any other cost as defined from time to time.

At step 360, deployment module 40 reads the segmentation data which may include, for example, criticality groups, the service level bands, and the available budget for inventory deployment. At step 365, deployment module 40 generates the coverage function for a criticality group that has the highest priority and a coverage constraint for the group from a service level band that has the highest priority. At this step, deployment module 40 minimizes the cost for the generated coverage function. At step 370, deployment module 40 compares the cost objective value with the available budget. If the cost is greater than the available budget, deployment module 40 proceeds to step 410 to write the stock level and coverage for each part at each location that was solved. If the cost is less than the available budget, deployment module 40 proceeds to step 375 to check whether there is a criticality group with next lower priority. If a next criticality group is not found, deployment module 40 proceeds to step 390.

At step 380, deployment module 40 adds the next lower priority criticality group with coverage from a service level band that has the highest priority to the existing coverage function and minimizes the cost. Once the cost objective is obtained, deployment module 40 returns to step 370. At step 390, coverage from a service level band that has the next low priority for the highest priority criticality group is used to re-generate the coverage function and minimize the cost. At step 395, deployment module compares the cost with the available budget. If the cost is greater than the available budget, deployment module 40 proceeds to step 410 to output the stock level and coverage for each part at each location. At step 400, deployment module 40 determines if there is any other criticality group with lower priority. If a lower priority criticality group is not found, deployment module 40 proceeds to step 410. At step 405, deployment module 40 updates the coverage for the criticality group from a service level band that has next lower priority. In addition, at step 405, deployment module 40 minimizes the cost and returns to step 395 to repeat the procedure until deployment module 40 runs out of budget or the coverage is satisfied for each part at each location. At step 410, deployment module 40 terminates after writing the results.

Although an embodiment of the invention and its advantages are described in detail, a person skilled in the art could make various alterations, additions, and omissions without departing from the spirit and scope of the present invention as defined by the appended claims.

What is claimed is:

1. A computer-implemented method for deploying a plurality of parts, comprising:

defining by a computer, a plurality of locations comprising a plurality of supply locations, a plurality of manufacturing locations, a plurality of demand locations, and a plurality of channels;

computing by the computer, a demand for each part at each location;

estimating by the computer, an availability lead-time for each part at each location and for each part at each channel;

calculating by the computer, a total landed cost for each part at each location and for each part at each channel;

computing by the computer, a lead-time demand for each part at each location and for each part at each channel using the availability lead-times for the part;

computing by the computer, a stock level for each part at each location and for each part at each channel;

determining by the computer, a completely filled demand from the lead-time demands and the stock levels;

determining by the computer, a partially filled demand from the lead-time demands and the stock levels; and generating by the computer, a coverage function for the parts at the locations and the channels from the completely filled demand and the partially filled demand.

2. The method of claim 1, further comprising:

transferring a demand from each of the plurality of demand locations and from each of the plurality of channels to one or more of the plurality of supply locations based on the order lead-time profiles;

creating virtual demand locations and virtual channels for the order lead-time demand transfers, wherein the virtual demand locations and the virtual channels represent the plurality of demand locations and the plurality of channels; and generating a coverage function for the parts at the virtual locations and channels from the completely filled demand and the partially filled demand.

3. The method of claim 1, further comprising:

optimizing the coverage function; and determining an optimal deployment of the parts at the locations for all the time periods according to the optimized coverage function.

4. The method of claim 1, further comprising:

determining a maximum stock level for the parts at the locations across the all the time periods in a multi-time period model; and computing new purchases for each part at each location in a multi-time period model.

5. The method of claim 1, further comprising:

determining a replenishment policy for each part at each location and for each time period.

6. The method of claim 1, further comprising:

classifying the parts at each location into categories based on demand volume and cost;

generating a coverage function according to the part categories; and determining a marginal value for minimizing the expected backorders and cost.

7. The method of claim 1, further comprising:

classifying intermediate locations;

grouping each intermediate location as echelons;

computing a total network cost according to the total landed cost of each part at each location;

using echelons for iterating coverage levels in order to find the optimal coverage levels for the intermediate locations according to the minimum total network cost; and determining optimal coverage levels for the intermediate locations by iteratively minimizing the total network cost objective function.

8. The method of claim 1, further comprising:

creating one or more criticality groups of parts and service level bands based on one or more segmentation rules.

9. The method of claim 1, wherein calculating the total landed cost for each part at each location comprising a target demand location comprises:

computing the total landed cost for each part at a supply endpoint;

computing the total landed cost for each part at each supply location; and computing the total landed cost for each part at each demand location according to the total landed cost for each part at the supply location.

10. The method of claim 1, wherein computing the lead-time demand for each part at each location comprising a manufacturing location comprises:

calculating a probability for supplying each part to each manufacturing location;

computing a process lead-time for an end product at each manufacturing location according to the probability; and computing the lead-time demand of an end product at each manufacturing location.

11. The method of claim 1, wherein computing the lead-time demand for an end product at each manufacturing location comprises:

receiving an ordered list comprising at least a subset of each supply location;

calculating a probability for supplying a plurality of raw material parts to each manufacturing location; and estimating the availability lead-time at each location based on the calculated probabilities.

12. The method of claim 1, wherein estimating the availability lead-time for an end product at each location comprising a target manufacturing location comprises:

determining the availability lead-time for an end product at each manufacturing location by repeating the following for a plurality of raw material parts:

estimating an availability lead-time for each raw material part at a supply endpoint;

estimating an availability lead-time for each raw material part at each supply location; and estimating a process lead-time for the end product at each manufacturing location according to the availability lead-time for each raw material part at each supply location.

13. The method of claim 1, further comprising:

computing a demand for a plurality of raw material parts at each location comprising a supply location comprises:

calculating a demand for an end product at each manufacturing location to receive a plurality of raw material parts from each supply location;

calculating a dependent demand at each supply location according to the demand for the end product at each manufacturing location;

calculating an independent demand at each supply location; and computing the demand at each supply location based on the dependent demand and the independent demand.

14. The method of claim 1, further comprising:

computing a demand for a plurality of raw material parts at each manufacturing location with an assembly process comprises:

calculating a demand for each raw material part from a demand for an end product at each manufacturing location based on a process yield;

calculating a demand for the end product at a demand endpoint;

calculating a demand for the end product at each demand location; and calculating a demand for the end product at each supply location.

15. The method of claim 1, further comprising:

computing the demand for a plurality of raw material parts at each location comprising a manufacturing location comprises:

determining a total demand by calculating a demand for each raw material from a demand for each co-product at each manufacturing location based on a process yield;

calculating a demand for each co-product at a demand endpoint;

calculating a demand for each co-product at each demand location; and calculating a demand for each co-product at each supply location.

16. A computer-implemented system for deploying a plurality of parts, comprising a server associated with one or more software components collectively configured to:

define a plurality of locations comprising a plurality of supply locations, a plurality of manufacturing locations, a plurality of demand locations, and a plurality of channels;

compute a demand for each part at each location;

estimate an availability lead-time for each part at each location and for each part at each channel;

calculate a total landed cost for each part at each location and for each part at each channel;

compute a lead-time demand for each part at each location and for each part at each channel using the availability lead-times for the part;

compute a stock level for each part at each location and for each part at each channel;

determine a completely filled demand from the lead-time demands and the stock levels;

determine a partially filled demand from the lead-time demands and the stock levels; and generate a coverage function for the parts at the locations and the channels from the completely filled demand and the partially filled demand.

17. The system of claim 16, wherein the one or more software components are further configured to:

transfer a demand from each of the plurality of demand locations and from each of the plurality of channels to one or more of the plurality of supply locations based on the order lead-time profiles;

create virtual demand locations and virtual channels for the order lead-time demand transfers, wherein the virtual demand locations and the virtual channels represent the plurality of demand locations and the plurality of channels; and generate a coverage function for the parts at the virtual locations and channels from the completely filled demand and the partially filled demand.

18. The system of claim 16, wherein the one or more software components are further configured to:

optimize the coverage function; and determine an optimal deployment of the parts at the locations for all the time periods according to the optimized coverage function.

19. The system of claim 16, wherein the one or more software components are further configured to:

determine a maximum stock level for the parts at the locations across the all the time periods in a multi-time period model; and compute new purchases for each part at each location in a multi-time period model.

20. The system of claim 16, wherein the one or more software components are further configured to:

determine a replenishment policy for each part at each location and for each time period.

21. The system of claim 16, wherein the one or more software components are further configured to:

classify the parts at each location into categories based on demand volume and cost;

generate a coverage function according to the part categories; and determine a marginal value for minimizing the expected backorders and cost.

22. The system of claim 16, wherein the one or more software components are further configured to:

classify intermediate locations;

group each intermediate location as echelons;

compute a total network cost according to the total landed cost of each part at each location;

use echelons for iterating coverage levels in order to find the optimal coverage levels for the intermediate locations according to the minimum total network cost; and determine optimal coverage levels for the intermediate locations by iteratively minimizing the total network cost objective function.

23. The system of claim 16, wherein the one or more software components are further configured to:

create one or more criticality groups of parts and service level bands based on one or more segmentation rules.

24. The system of claim 16, wherein the one or more software components are further configured to calculate the total landed cost for each part at each location comprising a target demand location by:

computing the total landed cost for each part at a supply endpoint;

computing the total landed cost for each part at each supply location; and computing the total landed cost for each part at each demand location according to the total landed cost for each part at the supply location.

25. The system of claim 16, wherein the one or more software components are further configured to compute the lead-time demand for each part at each location comprising a manufacturing location by:

calculating a probability for supplying each part to each manufacturing location;

computing a process lead-time for an end product at each manufacturing location according to the probability; and computing the lead-time demand of an end product at each manufacturing location.

26. The system of claim 16, wherein the one or more software components are further configured to compute the lead-time demand for an end product at each manufacturing location by:

receiving an ordered list comprising at least a subset of each supply location;

calculating a probability for supplying a plurality of raw material parts to each manufacturing location; and estimating the availability lead-time at each location based on the calculated probabilities.

27. The system of claim 16, wherein the one or more software components are further configured to estimate the availability lead-time for an end product at each location comprising a target manufacturing location by:

determining the availability lead-time for an end product at each manufacturing location by repeating the following for a plurality of raw material parts:

estimating an availability lead-time for each raw material part at a supply endpoint;

estimating an availability lead-time for each raw material part at each supply location; and estimating a process lead-time for the end product at each manufacturing location according to the availability lead-time for each raw material part at each supply location.

28. The system of claim 16, wherein the one or more software components are further configured to compute a demand for a plurality of raw material parts at each location comprising a supply location by:

calculating a demand for an end product at each manufacturing location to receive a plurality of raw material parts from each supply location;

calculating a dependent demand at each supply location according to the demand for the end product at each manufacturing location;

calculating an independent demand at each supply location; and computing the demand at each supply location based on the dependent demand and the independent demand.

29. The system of claim 16, wherein the one or more software components are further configured to compute a demand for a plurality of raw material parts at each manufacturing location with an assembly process by:

calculating a demand for each raw material part from a demand for an end product at each manufacturing location based on a process yield;

calculating a demand for the end product at a demand endpoint;

calculating a demand for the end product at each demand location; and calculating a demand for the end product at each supply location.

30. The system of claim 16, wherein the one or more software components are further configured to computing the demand for a plurality of raw material parts at each location comprising a manufacturing location by:

determining a total demand by calculating a demand for each raw material from a demand for each co-product at each manufacturing location based on a process yield;

calculating a demand for each co-product at a demand endpoint;

calculating a demand for each co-product at each demand location; and calculating a demand for each co-product at each supply location.

31. Software for deploying a plurality of parts, the software embodied in a computer-readable medium and, when executed using one or more computers is configured to:

define a plurality of locations comprising a plurality of supply locations, a plurality of manufacturing locations, a plurality of demand locations, and a plurality of channels;

compute a demand for each part at each location;

estimate an availability lead-time for each part at each location and for each part at each channel;

calculate a total landed cost for each part at each location and for each part at each channel;

compute a lead-time demand for each part at each location and for each part at each channel using the availability lead-times for the part;

compute a stock level for each part at each location and for each part at each channel;

determine a completely filled demand from the lead-time demands and the stock levels;

determine a partially filled demand from the lead-time demands and the stock levels; and generate a coverage function for the parts at the locations and the channels from the completely filled demand and the partially filled demand.

32. The software of claim 31, further configured to:

transfer a demand from each of the plurality of demand locations and from each of the plurality of channels to one or more of the plurality of supply locations based on the order lead-time profiles;

create virtual demand locations and virtual channels for the order lead-time demand transfers, wherein the virtual demand locations and the virtual channels represent the plurality of demand locations and the plurality of channels; and generate a coverage function for the parts at the virtual locations and channels from the completely filled demand and the partially filled demand.

33. The software of claim 31, further configured to:

optimize the coverage function; and determine an optimal deployment of the parts at the locations for all the time periods according to the optimized coverage function.

34. The software of claim 31, further configured to:

determine a maximum stock level for the parts at the locations across the all the time periods in a multi-time period model; and compute new purchases for each part at each location in a multi-time period model.

35. The software of claim 31, further configured to:

determine a replenishment policy for each part at each location and for each time period.

36. The software of claim 31, further configured to:

classify the parts at each location into categories based on demand volume and cost;

generate a coverage function according to the part categories; and determine a marginal value for minimizing the expected backorders and cost.

37. The software of claim 31, further configured to:

classify intermediate locations;

group each intermediate location as echelons;

compute a total network cost according to the total landed cost of each part at each location;

use echelons for iterating coverage levels in order to find the optimal coverage levels for the intermediate locations according to the minimum total network cost; and determine optimal coverage levels for the intermediate locations by iteratively minimizing the total network cost objective function.

38. The software of claim 31, further configured to:

create one or more criticality groups of parts and service level bands based on one or more segmentation rules.

39. The software of claim 31, further configured to calculate the total landed cost for each part at each location comprising a target demand location by:

computing the total landed cost for each part at a supply endpoint;

computing the total landed cost for each part at each supply location; and computing the total landed cost for each part at each demand location according to the total landed cost for each part at the supply location.

40. The software of claim 31, further configured to compute the lead-time demand for each part at each location comprising a manufacturing location by:

calculating a probability for supplying each part to each manufacturing location;

computing a process lead-time for an end product at each manufacturing location according to the probability; and computing the lead-time demand of an end product at each manufacturing location.

41. The software of claim 31, further configured to compute the lead-time demand for an end product at each manufacturing location by:

receiving an ordered list comprising at least a subset of each supply location;

calculating a probability for supplying a plurality of raw material parts to each manufacturing location; and estimating the availability lead-time at each location based on the calculated probabilities.

42. The software of claim 31, further configured to estimate the availability lead-time for an end product at each location comprising a target manufacturing location by:

determining the availability lead-time for an end product at each manufacturing location by repeating the following for a plurality of raw material parts:

estimating an availability lead-time for each raw material part at a supply endpoint;

estimating an availability lead-time for each raw material part at each supply location; and estimating a process lead-time for the end product at each manufacturing location according to the availability lead-time for each raw material part at each supply location.

43. The software of claim 31, further configured to compute a demand for a plurality of raw material parts at each location comprising a supply location by:

calculating a demand for an end product at each manufacturing location to receive a plurality of raw material parts from each supply location;

calculating a dependent demand at each supply location according to the demand for the end product at each manufacturing location;

calculating an independent demand at each supply location; and computing the demand at each supply location based on the dependent demand and the independent demand.

44. The software of claim 31, further configured to compute a demand for a plurality of raw material parts at each manufacturing location with an assembly process by:

calculating a demand for each raw material part from a demand for an end product at each manufacturing location based on a process yield;

calculating a demand for the end product at a demand endpoint;

calculating a demand for the end product at each demand location; and calculating a demand for the end product at each supply location.

45. The software of claim 31, further configured to compute the demand for a plurality of raw material parts at each location comprising a manufacturing location by:

determining a total demand by calculating a demand for each raw material from a demand for each co-product at each manufacturing location based on a process yield;

calculating a demand for each co-product at a demand endpoint;

calculating a demand for each co-product at each demand location; and calculating a demand for each co-product at each supply location.

* * * * *